United States Patent [19]
Kaneko et al.

[11] Patent Number: 5,548,766
[45] Date of Patent: Aug. 20, 1996

[54] MICROPROCESSOR FOR SELECTING DATA BUS TERMINAL WIDTH REGARDLESS OF DATA TRANSFER MODE

[75] Inventors: Hiroaki Kaneko; Yumiko Horiguchi, both of Tokyo, Japan

[73] Assignee: NEC Corporation, Tokyo, Japan

[21] Appl. No.: 478,113

[22] Filed: Jun. 7, 1995

Related U.S. Application Data

[63] Continuation of Ser. No. 919,485, Jul. 24, 1992, abandoned.

[30] Foreign Application Priority Data

Jul. 24, 1991 [JP] Japan .................................. 3-184253

[51] Int. Cl.$^6$ .................................................. G06F 15/76
[52] U.S. Cl. .......................... 395/775; 395/800; 395/886; 364/DIG. 1; 364/232.8; 364/232.9; 364/240.3
[58] Field of Search .................................. 395/307, 375, 395/500, 775, 800, 886

[56] References Cited

U.S. PATENT DOCUMENTS

| | | | |
|---|---|---|---|
| 4,447,878 | 5/1984 | Kinnie et al. | 395/325 |
| 4,514,808 | 4/1985 | Murayama et al. | 395/425 |
| 4,600,988 | 7/1986 | Tendulkar et al. | 395/325 |
| 4,633,437 | 12/1986 | Mothersole et al. | 395/325 |
| 5,014,186 | 5/1991 | Chisholm | 395/275 |
| 5,034,879 | 7/1991 | Woodward et al. | 395/375 |
| 5,109,332 | 4/1992 | Culley | 395/325 |
| 5,278,968 | 1/1994 | Koumoto | 395/800 |
| 5,300,811 | 4/1994 | Suzuki et al. | 257/691 |
| 5,341,481 | 8/1994 | Tsukamoto | 395/325 |
| 5,499,363 | 3/1996 | Kaneko | 395/280 |

OTHER PUBLICATIONS

NEC Electronics Inc., 16-Bit V-Series Microprocessor Data Book, 3a, pp. 1-11, 32, 3b, pp. 1-7, 10-11 (1990).
Intel Corp., 486 Microprocessor, pp. 2-17, 84-125 (1989).
Motorola, MC68020 32-Bit Microprocessor User's Manual, pp. 5-1 to 5-9 (2d ed 1984).
Motorola, MC68030 Enhanced 32-Bit Microprocessor User's Manual, pp. 1-1 to 1-7, 7-5 to 7-21 (2d ed 1989).

*Primary Examiner*—Lance Leonard Barry
*Attorney, Agent, or Firm*—Whitham, Curtis, Whitham & McGinn

[57] ABSTRACT

A bus cycle control unit of a microprocessor includes a sizing register for latching designation of a 16-bit data bus, and a bus cycle detector for detecting necessity of an additional bus cycle on the basis of the condition of the bus cycle. A command decoder, coupled to the sizing register and the bus cycle decoder, selectively drives bus enable terminals of the bus cycle control unit, and generates various control signals, so that data is transferred through either both the MSB (most significant bits) 16 bits and the (least significant bits) LSB 16 bits of a 32-bit data bus terminal, or only the LSB 16 bits of the 32-bit data bus terminal. Thus, the microprocessor can be freely coupled to a data bus of a fixed 32-bit width, a data bus of a fixed 16-bit width, or a data bus having its data width which can be switched between 32 bits and 16 bits.

2 Claims, 12 Drawing Sheets

FIGURE 4

| SSIZ | APND | LTYP$_1$～LTYP$_0$ | | LIA$_1$～LIA$_0$ | | BE$_3$(-)～BE$_0$(-) | | | | NOTE |
|---|---|---|---|---|---|---|---|---|---|---|
| 0 | X | 0 | 0 | 0 | 0 | 1 | 1 | 1 | 0 | |
| | | | | 0 | 1 | 1 | 1 | 0 | 1 | |
| | | | | 1 | 0 | 1 | 0 | 1 | 1 | |
| | | | | 1 | 1 | 0 | 1 | 1 | 1 | |
| | | 1 | 0 | 0 | X | 1 | 1 | 0 | 0 | |
| | | | | 1 | X | 0 | 0 | 1 | 1 | |
| | 0 | 1 | X | X | X | 0 | 0 | 0 | 0 | ADDITIONAL CYCLE |
| | 1 | 1 | X | X | X | 0 | 0 | 1 | 1 | |
| 1 | X | 0 | 0 | X | 0 | Z | Z | 1 | 0 | |
| | | | | X | 1 | Z | Z | 0 | 1 | |
| | | 1 | 0 | X | X | Z | Z | 0 | 0 | |
| | | 1 | X | X | X | Z | Z | 0 | 0 | ADDITIONAL CYCLE IS ALSO THE SAME |

FIGURE 5

| LR/W(-) | SSIZ | APND | LTYP1 | LTYP0 | LIA0 | LIA1 | OPWHHS | OPWHLS | OPWLLS | OPRHST | OPRLST | OPRHSL | NOTE |
|---|---|---|---|---|---|---|---|---|---|---|---|---|---|
| 0 | 0 | X | 0 | X | 0 | X | 1 | 0 | 1 | 0 | 0 | 0 | |
| | | | | | 1 | X | 1 | 1 | 0 | 0 | 0 | 0 | |
| | | 0 | 1 | X | X | X | 1 | 0 | 1 | 0 | 0 | 0 | ADDITIONAL CYCLE |
| | | 1 | 1 | X | X | X | 1 | 1 | 0 | 0 | 0 | 0 | ADDITIONAL CYCLE |
| | 1 | X | 0 | X | 0 | X | 0 | 0 | 1 | 0 | 0 | 0 | the same as SSIZ=0, excepting OPWHHS |
| | | | | | 1 | 0 | 0 | 1 | 0 | 0 | 0 | 0 | |
| | | 0 | 1 | X | X | X | 0 | 0 | 1 | 0 | 0 | 0 | ADDITIONAL CYCLE |
| | | 1 | 1 | X | X | X | 0 | 1 | 0 | 0 | 0 | 0 | ADDITIONAL CYCLE |
| 1 | 0 | X | 0 | X | X | X | 0 | 0 | 0 | 1 | 1 | 0 | |
| | | 0 | 1 | X | X | X | 0 | 0 | 0 | 1 | 1 | 0 | ADDITIONAL CYCLE |
| | | 1 | 1 | X | X | X | 0 | 0 | 0 | 1 | 0 | 1 | ADDITIONAL CYCLE |
| | 1 | X | 0 | X | 0 | X | 0 | 0 | 0 | 1 | 1 | 0 | |
| | | | | | 1 | X | 0 | 0 | 0 | 1 | 0 | 1 | |
| | | 0 | 1 | X | X | X | 0 | 0 | 0 | 1 | 1 | 0 | ADDITIONAL CYCLE |
| | | 1 | 1 | X | X | X | 0 | 0 | 0 | 1 | 0 | 1 | ADDITIONAL CYCLE |

FIGURE 10

| LR/W(-) | SSIZ | APND | LTYP$_1$ | LTYP$_0$ | LIA$_1$ | LIA$_0$ | A$_1$ | BE$_3$(-) | BE$_2$(-) | BE$_1$(-) | BE$_0$(-) | OPWHHS | OPWHLS | OPWLLS | OPRHST | OPRLST | OPRHSL | NOTE |
|---|---|---|---|---|---|---|---|---|---|---|---|---|---|---|---|---|---|---|
| 0 | 0 | 0 | 0 | 0 | 0 | 0 | 0 | 1 | 1 | 1 | 0 | 1 | 0 | 1 | 0 | 0 | 0 | |
|   |   |   |   |   | 0 | 1 | 0 | 1 | 1 | 0 | 1 | 1 | 0 | 1 | 0 | 0 | 0 | |
|   |   |   |   |   | 1 | 0 | 1 | 1 | 0 | 1 | 1 | 1 | 1 | 0 | 0 | 0 | 0 | |
|   |   |   |   |   | 1 | 1 | 1 | 0 | 1 | 1 | 1 | 1 | 1 | 0 | 0 | 0 | 0 | |
|   |   |   | 0 | 1 | 0 | 0 | 0 | 1 | 1 | 0 | 0 | 1 | 0 | 1 | 0 | 0 | 0 | |
|   |   |   |   |   | 1 | 0 | 1 | 0 | 0 | 1 | 1 | 1 | 1 | 0 | 0 | 0 | 0 | |
|   |   |   | 0 | 1 | X | 0 | 0 | 0 | 0 | 0 | 0 | 0 | 1 | 0 | 1 | 0 | 0 | 0 | |
|   |   | 1 | 1 | X | 0 | 0 | 1 | 0 | 0 | 1 | 1 | 1 | 1 | 0 | 0 | 0 | 0 | ADDITIONAL CYCLE |
|   | 1 | 0 | 0 | 0 | 0 | 0 | 0 | Z | Z | 1 | 0 | 0 | 0 | 1 | 0 | 0 | 0 | |
|   |   |   |   |   | 0 | 1 | 0 | Z | Z | 0 | 1 | 0 | 0 | 1 | 0 | 0 | 0 | |
|   |   |   |   |   | 1 | 0 | 1 | Z | Z | 1 | 0 | 0 | 1 | 0 | 0 | 0 | 0 | |
|   |   |   |   |   | 1 | 1 | 1 | Z | Z | 0 | 1 | 0 | 1 | 0 | 0 | 0 | 0 | |
|   |   |   | 0 | 1 | 0 | 0 | 0 | Z | Z | 0 | 0 | 0 | 0 | 1 | 0 | 0 | 0 | |
|   |   |   |   |   | 1 | 0 | 1 | Z | Z | 0 | 0 | 0 | 1 | 0 | 0 | 0 | 0 | |
|   |   |   | 0 | 1 | X | 0 | 0 | 0 | Z | Z | 0 | 0 | 0 | 0 | 1 | 0 | 0 | 0 | |
|   |   | 1 | 1 | X | 0 | 0 | 1 | Z | Z | 0 | 0 | 0 | 1 | 0 | 0 | 0 | 0 | ADDITIONAL CYCLE |
| 1 | 0 | 0 | 0 | 0 | 0 | 0 | 0 | 1 | 1 | 1 | 0 | 0 | 0 | 0 | 1 | 1 | 0 | |
|   |   |   |   |   | 0 | 1 | 0 | 1 | 1 | 0 | 1 | 0 | 0 | 0 | 1 | 1 | 0 | |
|   |   |   |   |   | 1 | 0 | 1 | 1 | 0 | 1 | 1 | 0 | 0 | 0 | 1 | 1 | 0 | |
|   |   |   |   |   | 1 | 1 | 1 | 0 | 1 | 1 | 1 | 0 | 0 | 0 | 1 | 1 | 0 | |
|   |   |   | 0 | 1 | 0 | 0 | 0 | 1 | 1 | 0 | 0 | 0 | 0 | 0 | 1 | 1 | 0 | |
|   |   |   |   |   | 1 | 0 | 1 | 0 | 0 | 1 | 1 | 0 | 0 | 0 | 1 | 1 | 0 | |
|   |   |   | 0 | 1 | X | 0 | 0 | 0 | 0 | 0 | 0 | 0 | 0 | 0 | 0 | 1 | 1 | 0 | |
|   |   | 1 | 1 | X | 0 | 0 | 1 | 0 | 0 | 1 | 1 | 0 | 0 | 0 | 1 | 0 | 1 | ADDITIONAL CYCLE |
|   | 1 | 0 | 0 | 0 | 0 | 0 | 0 | Z | Z | 1 | 0 | 0 | 0 | 0 | 1 | 1 | 0 | |
|   |   |   |   |   | 0 | 1 | 0 | Z | Z | 0 | 1 | 0 | 0 | 0 | 1 | 1 | 0 | |
|   |   |   |   |   | 1 | 0 | 1 | Z | Z | 1 | 0 | 0 | 0 | 0 | 1 | 0 | 1 | |
|   |   |   |   |   | 1 | 1 | 1 | Z | Z | 0 | 1 | 0 | 0 | 0 | 1 | 0 | 1 | |
|   |   |   | 0 | 1 | 0 | 0 | 0 | Z | Z | 0 | 0 | 0 | 0 | 0 | 1 | 1 | 0 | |
|   |   |   |   |   | 0 | 1 | 1 | Z | Z | 0 | 0 | 0 | 0 | 0 | 1 | 0 | 1 | |
|   |   |   | 0 | 0 | X | 0 | 0 | 0 | Z | Z | 0 | 0 | 0 | 0 | 0 | 1 | 1 | 0 | |
|   |   | 1 | 1 | X | 0 | 0 | 1 | Z | Z | 0 | 0 | 0 | 0 | 0 | 1 | 0 | 1 | ADDITIONAL CYCLE |

MICROPROCESSOR FOR SELECTING DATA BUS TERMINAL WIDTH REGARDLESS OF DATA TRANSFER MODE

This is a continuation of application Ser. No. 07/919,485 filed Jul. 24, 1992 now abandoned.

BACKGROUND OF THE INVENTION

1. Field of the Invention

The present invention relates to a microprocessor, and more specifically to a data transfer structure of a microprocessor capable of complying with a plurality of different data bus widths.

2. Description of Related Art

In a data processing system using a microprocessor, processing performance is influenced by a bit width of a data bus for transferring data between the microprocessor and a memory which stores instruction codes and operands.

A data width is typified by, for example, 8 bits, 16 bits, and 32 bits, which are a power of 2. If a large data bus width is adopted, data transfer capacity can be increased. Therefore, the large data bus width is very convenient in an application having a large number of opportunities of handling data of a wide width.

However, the increase of the data bus width is accompanied by following disadvantages:

(1) The minimum constituting unit of a memory is increased:

For example, if a dynamic RAM (random access memory) chip of 8 bits×128K words is used, a memory of one minimum construction can be constituted of only one RAM chip in the case of a 8-bit bus. In the case of a 16-bit bus, on the other hand, two RAM chips are required to constitute a memory of one minimum construction. If a required memory capacity is 128 Kbytes, the latter case is equipped with a wasteful memory capacity of 128 Kbytes. Namely, a memory system having a wide bus width often has the above mentioned wasteful area (which is generally called a "fragmentation").

(2) A wiring zone is increased:

If a wide bus width is adopted, the number of wiring conductors for physically connecting a data bus between the microprocessor and the memory system is increased. Since parts such as LSI (large scale integrated) chips or other components cannot be located on wiring conductor patterns foraged on a printed circuit board, the overall size of the system is inevitably increased.

(3) The number of dam buffers is increased:

A large driving power for driving a data bus connected between the microprocessor and the memory system is required in view of the current, electrostatic capacitance and noise. On the other hand, since buffers having a large capacity for driving the data bus cannot be internally assembled in the microprocessor or in the memory chip, it is necessary to externally provide an integrated circuit for data buffers. These data buffers have not only a high driving power, but also a large electric power consumption. Therefore, it becomes a large cause of heat generation in the overall system, and an electric power source having an increased capacity becomes necessary.

Under the above mentioned circumstance, it is desired to increase the data bus width in order to elevate performance, even if the above mentioned disadvantages are encountered. In this case, it is desired to increase the data bus width, without rewriting software.

Microprocessors, which have the same architecture in register sets, instruction sets, instruction codes, etc, but which have different data bus widths, have been proposed. For example, 8/16-bits microprocessors V20/V30 available from NEC Corporation have the same architecture and are so configured that internal processing is performed with 16 bits. However, the V20 microprocessor has a data bus terminal of 8 bits, and V30 microprocessor has a data bus terminal of 16 bits. Since there is a difference in data transfer capacity because of the difference in the bus width, the V20 and V30 microprocessors have different capacities of an instruction prefetch buffer. The microprocessor has 4 bytes, and the V30 microprocessor has 6 bytes. In addition, the construction and the operation for the instruction execution and the instruction decoding are the same, but there is a difference in the bus control circuit for controlling the data bus and in the terminal function.

As mentioned above, since the V20 and V30 microprocessors have the same architecture, a program operating in one of the microprocessor can operate in the other microprocessor. But, the V20 and V30 microprocessors are different in performance, which are attributable to only to a difference in the number of clocks. Specifically, the V30 microprocessor has a maximum data transfer capacity which is double that of the V20 microprocessor and has an average performance which is 1.3 times to 1.5 times that of the V20 microprocessor. Accordingly, a user can select one of the V20 and V30 microprocessors from a total consideration of a required system performance and a required total cost.

On the other hand, a 32-bit microprocessor i80486 available from Intel Corp. can be coupled with data buses having different bus widths. This microprocessor has data of 8/16/32 bits for basic operation, but has an external data bus terminal of 32 bits. An external access of 8 bits and 16 bits is performed by dividing the external data bus of 32 bits into four 8-bit units of 8 bits and by selectively utilizing one or two of the four units.

In addition, the i80486 microprocessor has a 30-bit address terminal of A31 to A2 for designating an address for an external memory. This address indicates an address for the 32-bit (word) data, but it does not indicate an address for the 16-bit (half word) data or the 8-bit (byte) data. In order to transfer data between the microprocessor and the external memory, the microprocessor has a 32-bit data bus terminal of D31 to D0, which is divided into four 8-bit units for convenience of explanation. Here, the four 8-bit units are called B3(D31-D24), B2(D23-D16), B1(D15-D8) and B0(D7-D0).

Furthermore, the microprocessor has four output terminals BE3(−) to BE0(−) for indicating which of the four 8-bit units is to be used for the data transfer. Here, the parenthesized minus indicates a negative logic. The BE3(−) terminal indicates that data is transferred by using the 8-bit unit B3 of the data bus terminal. Similarly, the BE2(−) terminal corresponds to the 8-bit unit B2 of the data bus terminal, and the BE1(−) terminal and the BE0(−) terminal correspond to the 8-bit unit B1 and the 8-bit unit B0 of the data bus terminal, respectively.

For example, assuming that data of 16 bits is transferred between the microprocessor mid an address "No. 1" of a memory, "00000001$_h$" for the 32-bit data is outputted from the address terminal, and "0011$_h$" for indicating effectiveness of the data bus is outputted to the BE3(−) to BE0(−) terminals. Here, the subscript "h" indicates a hexadecimal notation, and the subscript "b" shows a binary notation. Thus, in the case of reading, 32-bit data on the address "No. 1" of the external memory is accessed, and 16-bit data is transferred to the microprocessor through the 8-bit units B3 and B2 of the data bus terminal. In the case of writing, 16-bit data is transferred from the microprocessor to the 8-bit units B3 and B2 of the data bus terminal, and then to the external memory.

In the i80486 microprocessor, the most significant 16 bits (B3 and B2) of the data bus terminal is used in the following cases:

(1) 32-bit data is accessed.

(2) 16-bit data having the least significant two bits other than "$00_b$" is accessed.

(3) 8-bit data having the least significant two bits other than "$0X_b$" is accessed (where "X" shows an indefinite value).

In addition, only one bus cycle is perforated in the following cases:

(1) 32-bit data having the least significant two bits of "$00_b$" is accessed.

(2) 16-bit data having the least significant two bits other than "$11_b$" is accessed.

Therefore, the i80486 microprocessor cannot be coupled to an external memory having a 16-bit width, by using only the least significant 16 bits D15 to D0 of the data bus terminal D32 to D0.

In order to solve this problem, the i-80486 microprocessor is provided with a BS16(–) terminal for the data transfer by the 16-bit width data bus and a BS8(–) terminal for the data transfer by the 8-bit width data bus. If one of these terminals is activated in a bus cycle, data can be transferred by using only the least significant 16 bits (B1 and B0) of the data bus terminal or only the least significant 8 bits (B0) of the data bus terminal.

Here, for simplification of explanation, the data transfer using the 16-bit width data bus by activating the BS16(–) terminal will be explained. Similarly to the above case, assume that data of 16 bits is transferred between the microprocessor and an address "No. 1" of a memory.

Under the precondition that the 32-bit bus can be used, the i80486 microprocessor outputs the most significant 8 bits and the least significant 8 bits of the 16-bit data to the 8-bit units B2 and B1 of the data bus terminal. On the other-hand, "$1001_b$" is outputted to the BE3(–) to BE0(–) terminals.

Before the completion of the bus cycle, if the i80486 microprocessor detects that the BS16(–) terminal is in activated condition, one bus cycle is succeedingly added. In this additional bus cycle, "$1011_b$" is outputted to the BE3(–) to BE0(–) terminals. The most significant 8 bits of the 16-bit data is outputted to the 8-bit unit B2 of the data bus terminal.

As seen from the above, the least significant 8 bits of the 16-bit data is transferred in the first bus cycle and the most significant 8 bits of the 16-bit data is transferred in the second and additional bus cycle.

The above mentioned method in which after the bus cycle is started, an external condition (the status of the BS16(–) terminal) is detected, and a bus cycle is added on the basis of the result of the detection so that data is transferred to a data bus having a narrow bit width, is called a "dynamic bus-sizing function".

However, when data having different bit widths (for example, 8/16/32 bits) is transferred by coupling to data buses of different bit widths (for example, a fixed 32-bit width and a fixed 16-bit width), the following problems have been encountered:

(1) The power consumption is large:

Referring to the above mentioned example, in the first bus cycle, invalid 8-bit data is driven to the 8-bit units B3 and B0 of the 32-bit data bus terminal, and 8-bit data that is not actually transferred is driven to the 8-bit unit B2 of the 32-bit data bus terminal. In the second bus cycle, invalid 8-bit data is driven to the 8-bit units B3, B1 and B0 of the 32-bit data bus terminal. Thus, since the opportunity of driving the data bus terminal portion which is not used for the actual data transfer is increased, and therefore, a wasteful power consumption occurs.

(2) The number of external circuits is increased:

Buffers are required to selectively couple the data bus terminal of the microprocessor with the external data bus in units of 8 bits. In the above mentioned example the four 8-bit units B3(D31-D24), B2(D23-D16), B1(D15-D8) and B0(D7-D0) of the 32-bit data bus terminal of the microprocessor are connected through four external data bus buffers to the data bus. The reason for this is that, in the dynamic bus-sizing system, since the bit width of the data bus is detected at the first place after the bus cycle is started, data is transferred in the first bus cycle, assuming the maximum bit width (for example 32 bits).

SUMMARY OF THE INVENTION

Accordingly, it is an object of the present invention to provide a microprocessor which has overcome the above mentioned defects of the conventional one.

Another object of the present invention is to provide a data transfer structure of a microprocessor capable of complying with a plurality of different data bus widths, with a decreased power consumption and with reduced external circuits.

The above and other objects of the present invention are achieved in accordance with the present invention by a microprocessor having a function of dynamically selecting, for each bus cycle, whether data is transferred through the whole of a data bus terminal or through only a portion of the data bus terminal. The microprocessor comprises a data bus terminal of a plurality of bits, a first means for receiving an external notice of change of data transfer mode, a second means for receiving an external notice that only one portion of the data bus terminal is fixedly used for data transfer, a third means for exchanging data that should be transferred through the one portion of the data bus terminal, with data that should be transferred through the other portion of the data bus terminal when data is transferred through the whole of the data bus terminal, and a fourth means for bringing the other portion of the data bus terminal into a high impedance condition when data is transferred through the one portion of the data bus terminal. When the second means receives the external notice that the one portion of the data bus terminal is fixedly used for data transfer, data is transferred through the one portion of the data bus terminal under control of the third means regardless of a condition of the first means, and the other portion of the data bus terminal is maintained in a high impedance condition by the fourth means.

As mentioned hereinbefore, in order to comply with data buses having different bit widths, the conventional microprocessor is configured to detect the bit width of the data bus after start of a bus cycle, and then to add a required number of additional bus cycles. In addition, the conventional microprocessor has an exclusively used aligner for realizing an alignment function. However, the microprocessor in the present invention detects the bus width at tile time of resetting, and starts an optimum number of bus cycles at the time of starting the data transfer. On the other hand, the alignment function is realized by time-dividing the shift function of the execution section.

According to another aspect of the present invention, there is provided a microprocessor having a function of dynamically selecting, for each bus cycle, whether data is transferred to a memory or an input/output device through the whole of a data bus terminal or through only a portion of the data bus terminal. The microprocessor comprises a data bus terminal of a plurality of bits, a first means for receiving an external notice of change of data transfer mode, a second means for receiving an external notice that only one portion of the data bus terminal is fixedly used for data transfer, a third means for exchanging data that should be transferred through the one portion of the data bus terminal, with data that should be transferred through the other portion of the data bus terminal when data is transferred through the whole of the data bus terminal, a fourth means for bringing the other portion of the data bus terminal into a high impedance condition when data is transferred through the one portion of the data bus terminal, a fifth means for externally notifying an effective portion of the data bus terminal, a sixth means for bringing into a high impedance condition a portion of the fifth means other than the portion of the fifth means notifying the effective portion of the data bus terminal, and a seventh means for externally notifying an address to which data is to be transferred through the data bus terminal. When the second memos receives the external notice that the one portion of the data bus terminal is fixedly used for data transfer, data is transferred through the one portion of the data bus terminal under control of the third means regardless of a condition of the first means, and at the same time, an address is externally notified by the seventh means and an effective portion of the data bus terminal is eternally notified by the fifth means, the other portion of the data bus terminal and the other portion of the fifth means are maintained in a high impedance condition by the fourth means and the sixth means.

The above and other objects, features and advantages of the present invention will be apparent from the following description of preferred embodiments of the invention with reference to the accompanying drawings.

BRIEF DESCRIPTION OF THE DRAWINGS

FIG. 4 is a table showing the values of signals internally generated in the bus,cycle control unit shown in FIG. 1;

FIG. 5 is a table showing the values of other signals internally generated in the bus cycle control unit shown in FIG. 1;

FIG. 10 is a table showing the values of signals internally generated in the bus cycle control unit shown in FIG. 7;

DESCRIPTION OF THE PREFERRED EMBODIMENTS

Figure 1:
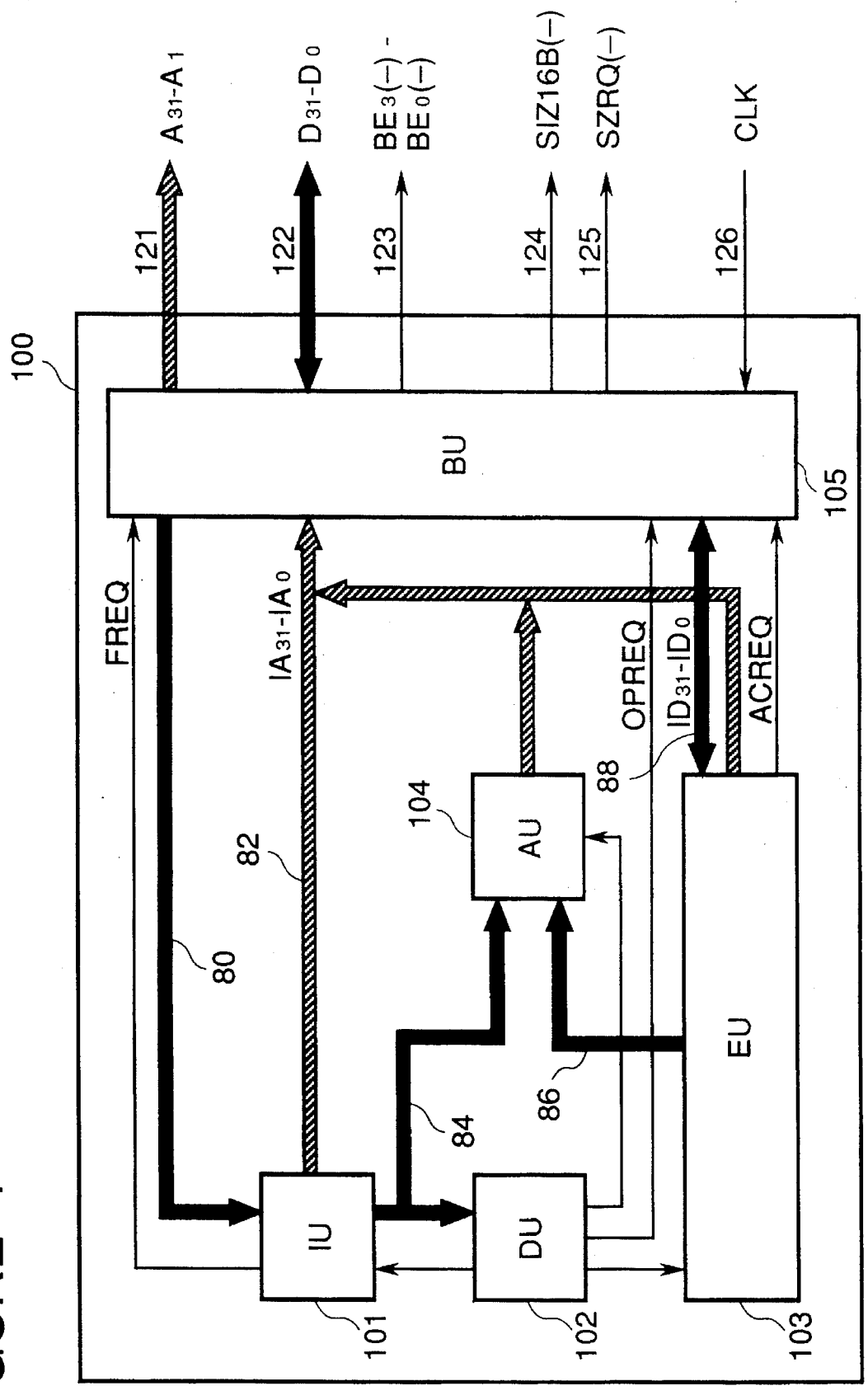
FIG. 1 is a block diagram of one embodiment of the microprocessor in accordance with the present invention capable of connecting with a 16-bit data bus or a 32-bit data bus.

Referring to FIG. 1, there is shown a block diagram of one embodiment of the microprocessor in accordance with the present invention capable of connecting with a 16-bit data bus or a 32-bit data bus.

The shown microprocessor, generally designated by Reference Numeral 100, and capable of carrying out a pipelined operation, comprises an instruction fetch unit (abbreviated to "IU") 101, an instruction decoding unit (abbreviated to "DU") 102, an instruction execution unit (abbreviated to "EU") 103, an effective address calculation unit (abbreviated to "AU") 104 and a bus cycle control unit (abbreviated to "BU") 105.

The IU 101 controls a start of an instruction fetch cycle and accumulates instruction codes fetched from an external device in the instruction fetch cycles. The IU 101 can be constituted to include therein an instruction code cache. The instruction codes have either a 16-bit length or a 32-bit length. Here, it is assumed that each instruction code is located from a half-word boundary of a memory (the least significant bit of the address is "0").

The DU 102 decodes the instruction code supplied from the IU 101, and generates signals for processing inherent to each instruction. The signals generated by the DU 102 are supplied as operation instruction signals to each unit, although a part of the signals are omitted in the drawings for simplification of the drawings.

The EU 103 includes 32 general registers each having a 32-bit width, an arithmetic and logic unit (ALU) having a 32-bit width, a barrel shifter, etc. for the purpose of executing an instruction designated by the DU 102. An internal control of the EU 102 can be realized either on the basis of hardware such as a wired-logic, or on the basis of a microprogram.

The AU 104 calculates an address for an operand or operands when the DU detects that a given instruction includes an access to a memory or an I/O (input/output) device. As one element for the address calculation, a displacement value contained in the instruction code, or a value of a general register is used. In the former case, the displacement value is supplied from the IU 101, and in the latter case, the value is supplied from the EU 103. An operand data is a 8/16/32 bit format. A 16-bit data is located from a half-word boundary (the least significant bit of the address is "0"), and a 32-bit data is located from a word boundary (the least significant bit of the address is "$00_b$", where the subscript "b" indicates a binary notation).

The BU 105 generates an external bus cycle on the basis of an address, data and a start request given from other units. Data read from an external device in the bus cycle is supplied to the IU 101, and an operand data is supplied to the EU 103.

The above mentioned units are connected to one another in the inside the microprocessor by a bus structure as shown in FIG. 1.

The BU 105 and the IU 101 are coupled to each other by a bus 80 for transferring the instruction codes and by another bus 82 for transferring (through IA31 to IA0) an address used in the bus cycle other than the operand access. The IU 101 and the DU 102 are coupled to each other by a bus 84 for transferring the instruction codes. The IU 101 and the AU 104 are coupled to each other by the bus 84 for transferring the address elements used for the address calculation, and the EU 103 and the AU 104 are coupled to each other by a bus 86 for transferring the address elements used for the address calculation. In addition, the EU 103 and the BU 104 are coupled to each Other by a bus 88 for bidirectionally reading an operand or writing an operand (through ID31 to ID0). The AU 104 and the BU 105 are coupled to each other by the bus 82 for transferring the effective address (through IA31 to IA0), and the EU 103 and the BU 105 are connected to each other by the bus 82 for transferring the address used in the bus cycle (through IA31 to IA0).

In addition, the IU generates a bus cycle start request (FREQ) signal to the BU 105, and the DU generates an operand request (OPREQ) signal also to the BU 105. In addition, the EU 103 generates an access request (ACREQ) signal to the DU 105. Each of these signals is composed of a plurality of signals for indicating the kind of bus cycle, and another plurality of signals for defining the timing.

For the bus cycle, the BU 105 has address bus terminals 121 of A31 to A1 for outputting a 31-bit half word address (address of 16-bit unit), data bus terminals 122 of D31 to D1 for sending and receiving a 32-bit data, byte enable output terminals 123 of B3E(–) to B0E(–), where the sign "–" (minus) indicates a negative logic. B3E(–) corresponds to D31 to D24, and B2E(–), B1E(–) and B0E(–) correspond to D23 to D16, D15 to D8, and D7 to D0, respectively. The BU 105 also has an input terminal 124, SIZE16B(–) for designating that the data is transferred by using the least significant 16 bits of the data bus, at the time of resetting, and another input terminal 125, SZRQ(–) for requesting issue of an additional bus cycle and a dynamic bus sizing function for the 16-bit data bus.

A basic bits cycle is constituted of two states T1 and T2, which are in synchronism with a reference clock CLK supplied to a clock input terminal 126 of the microprocessor. The other signals indicating the kind of bus cycle, a start timing, and the others are omitted in the drawings.

Figure 2:
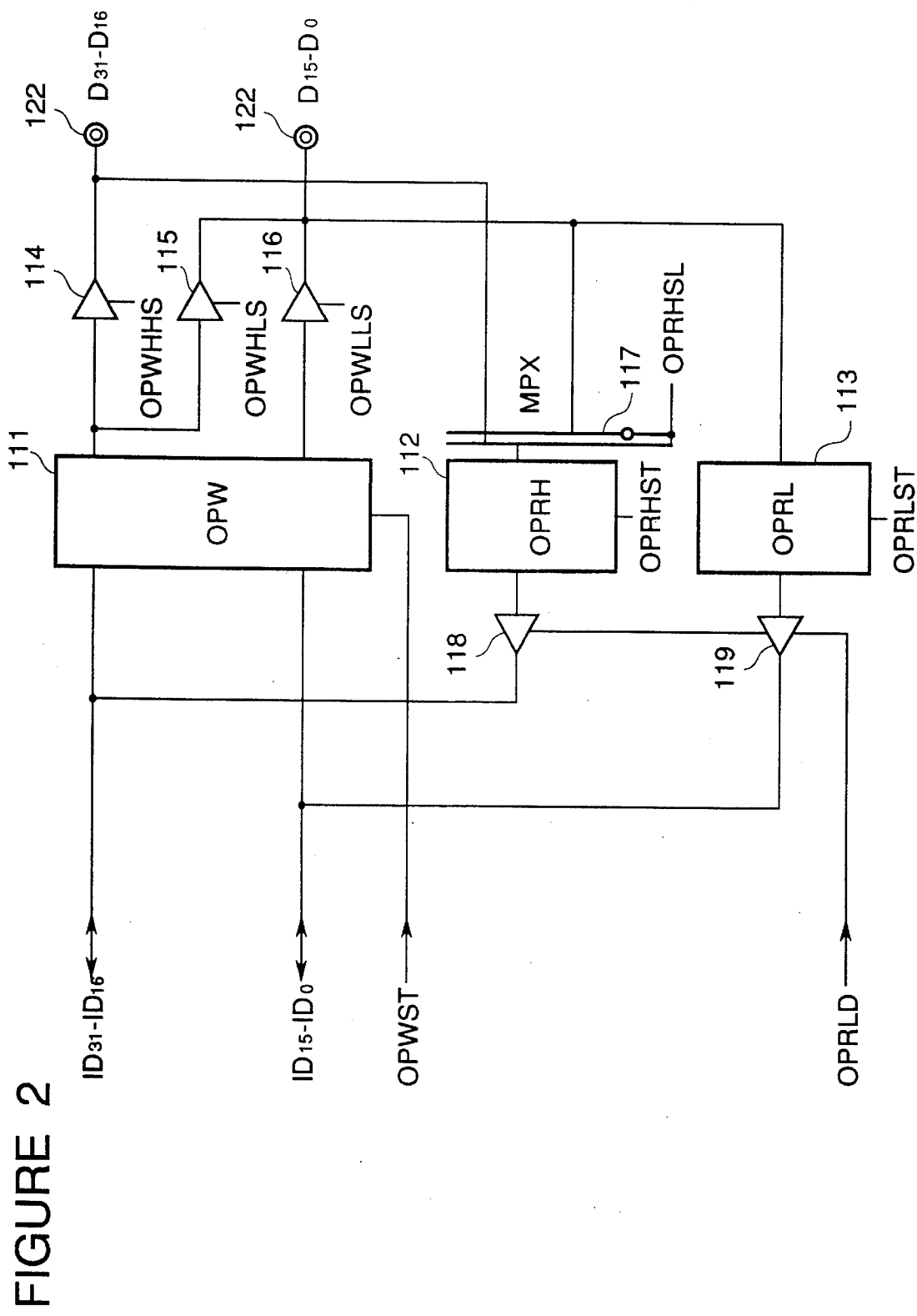
FIG. 2 is a block diagram of the data section of the bus cycle control unit shown in FIG. 1.
Figure 3:
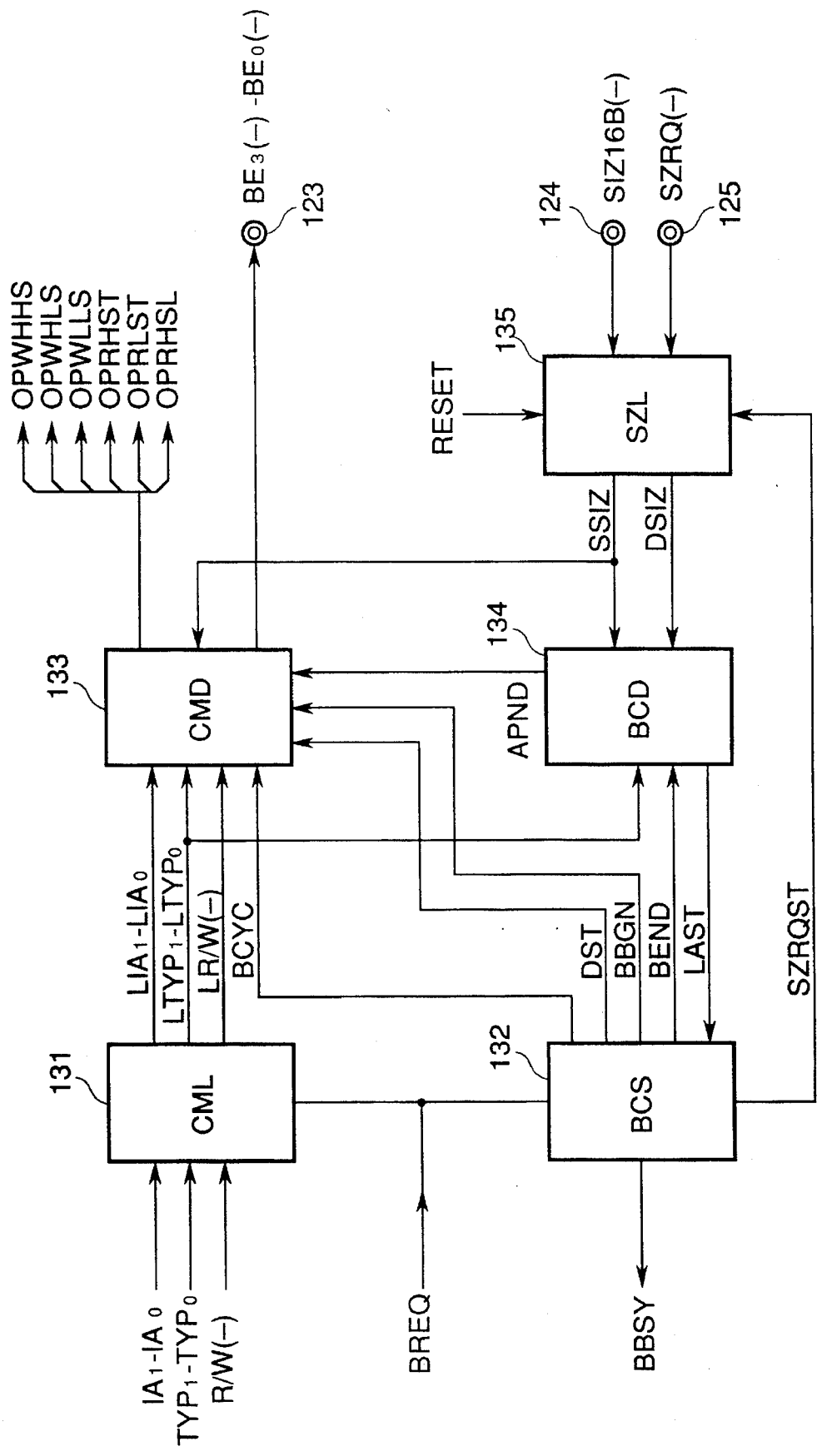
FIG. 3 is a block diagram of the control section of the bus cycle control unit shown in FIG. 1.

Referring to FIGS. 2 and 3, there are respectively shown a data section and a control section of the BU 105 which are important in the present invention.

In FIG. 2, an operand write register (abbreviated "OPW") 111 is composed of a 32-bit register for holding a write operand on the internal data bus 88, ID 31 to ID0 transferred from the EU 103, in response to an operand write strobe (OPWST) signal (not shown in FIG. 1) from the EU 103. For convenience of explanation, the 32 bits are divided into most significant 16 bits and least significant 16 bits in the drawing. An output of the OPW 111 drives the data bus terminals 122 through operand write buffers 114, 115 and 116 in the following manner:

(1) The most significant 16 bits of the output of the OPW 111 drive the most significant 16-bit terminals D31 to D16 with by the buffer 114;

(2) The most significant 16 bits of the output of the OPW 111 drive the least significant 16-bit terminals D15 to D0 by the buffer 115;

(1) The least significant 16 bits of the output of the OPW 111 drive the least significant 16-bit terminals D15 to D0 by the buffer 116.

Activation signals for the operand write buffers 114, 115 and 116 are labelled "OPWHHS", "OPWHLS" and "OPWLLS", respectively. If none of the operand write buffers 114, 115 and 116 is activated, the terminals D31 to D16 and D15 to D0 are brought into a high impedance (Hi-Z) condition An operand read register includes a most significant 16-bit register (abbreviated "OPRH") 112 and a least significant 16-bit register (abbreviated "OPRL") 113, which latch most significant 16 bits or least significant 16 bits of the read operand on the data bus terminals D31 to D0. A latch signal for the OPRH 112 is labelled "OPRHST", and a signal for the OPRL 113 is labelled "OPRLST".

Outputs of the OPRH 112 and the OPRL 113 drive the internal data bus ID31 to ID0 through operand read buffers 118 and 119 which are activated by an OPRLD signal (not shown in FIG. 1) from the EU 104, so that the data is transferred to the EU 104.

A multiplexor (abbreviated "MUX") 117 supplies the data D31 to D16 to an input of the OPRH 112 when an OPHSL signal is inactive ("0"), and also supplies the data D15 to D0 to the input of the OPRH 112 when the OPHSL signal is inactive ("1").

In FIG. 3, a command register (abbreviated "CML") 131 responds to a bus cycle start request (BREQ) signal (not shown in FIG. 1) from the EU 104, so as to latch the least significant 2 bits IA1 and IA0 of the internal address bus 82, a TYP1-TYP0 signal indicating the data type of the bus cycle to be started, and a R/W(–) signal indicating which of the read transfer and the write transfer is to be started. When the TYP1-TYP0 signal is "1X$_b$" where "X" is indefinite, the 32-bit transfer is designated. When the TYP1-TYP0 signal is "01$_b$" the 16-bit transfer is designated, and when the TYP1-TYP0 signal is "00$_b$," the 8-bit transfer is designated. Outputs LIA1-LIA0, LTYP1-LTYP0, LR/W(–) of the CML 131 are supplied to a command decoder (abbreviated "CMD") 133 and a bus cycle detector (abbreviated "BCD") 134, respectively.

A bus cycle sequencer (abbreviated "BCS") 132 responds to the BREQ signal (requesting the start of the bus cycle) so as to detect the status of a current bus cycle on the basis of a LAST signal and a bus cycle end ready signal from an external terminal (omitted in the drawing), and to control the start of a new bus cycle. In addition, the BCS 132 generates the T1 and T2 states mid also generates a BBSY signal (not shown in FIG. 1) for inhibiting the EU 104 from generating a next bus cycle start request. The T2 state is in some cases repeated by the bus cycle end ready signal. The BCS 132 generates the following bus cycle status signals:

DST: which indicates a timing for latching information on the data bus terminal 122 in the read bus cycle into the inside of the microprocessor 100 and which is generated at a second half of the last T2 state;

BBGN: which indicates that the bus cycle has been started and which is generated in a first half of the T1 state;

BEND: which indicates an end timing of the bus cycle requested to be started and which is generated in a first half of the last T2 state;

BCYC: which indicates that the bus cycle is executing and which continues from a second half of the T1 state to a timing which is later than the last T2 state by a half of one clock; and SZRQST: which indicates a timing for latching the status of the SZRQ(–) terminal 125 into a sizing latch (abbreviated "SZL") 135 and which is generated in a first half of the T2 state.

When the BCS 132 receives the BREQ signal, the BCS 132 starts a sequence of the bus cycle composed of the T1 and T2 states. At the same time, the BCS 132 activates the BBSY signal to the EU 104, so that the EU 104 will not request a new bus cycle start. When the T2 state is completed, if the BCD 134 activates the LAST signal indicating that the bus cycle had been the last bus cycle, the BCS 132 inactivates the BBSY signal and generates the BEND signal. On the other hand, if the LAST signal is inactive, the BCS 132 starts a sequence of a further one bus cycle (additional bus cycle).

On the basis of the LTYP1-LTYP0 signal Supplied from the CML 131 and SSIZ signal and DSIZ signal supplied from a SZL 135 explained hereinafter, the BCD 134 discriminates whether or not the bus cycle requested to be started needs an additional bus cycle. The BCD 134 generates an APND signal indicating that a first bus cycle has been completed and succeedingly an additional bus cycle is started. In addition, the BCD 134 maintains the LAST signal in an active condition when no additional bus cycle is required. When the additional bus cycle is required, the LAST signal is activated afar a first bus cycle is completed.

Furthermore, the BCD 134 detects the request of the sizing on the basis of a logic sum of the SSIZ signal and the DSIZ signal and also detects the request of the bus cycle start for transferring the 32-bit data, by the LTYP1-LTYP0 signal of "$1X_b$". When the sizing is requested and when the bus cycle start for transferring the 32-bit data is requested, the BCD 134 detects the necessity of the additional bus cycle. On the other hand, the BCD 134 detects the completion of the bus cycle by the BEND signal.

A sizing register (abbreviated "SZL") 135 responds to a reset signal RESET so as to latch the status of the 16-bit bus designation input terminal SIZ16B(−) 124. When the 16-bit bus is designated (namely, when 16-bit bus designation input terminal SIZ 16B(−) 124 is active "0"), the SZL 135 holds the SSIZ signal in an active condition ("1"). When the 16-bit bus is not designated (namely, when 16-bit bus designation input terminal SIZ16B(−) 124 is inactive "1"), the SZL 135 holds the SSIZ signal in an inactive condition ("0"). In addition, the BVCD 135 latches the status of the dynamic sizing input terminal SZR Q(−) 125 in response to a SZRQST signal. If the dynamic sizing is designated (namely when the dynamic sizing input terminal SZRQ(−) 125 is active "0"), the SZL 135 holds the DSIZ signal in an active condition ("1").

The CMD 133 drives the byte enable terminals BE3(−) to BE0(−) 123 on the basis of various signals supplied from the CML 131, the BCS 132, the BCD 134 and the SZL 135. Basically, the driving of the byte enable terminals BE3(−) to BE0(−) 123 is determined by the designated address (notified by the LIA1-LIA0 signal) and the bit length of the data (notified by the LTYP1-LTYP0 signal). In the case of the additional bus cycle (notified by the APND signal), a special value is selected.

The output value is different depending upon whether the 16-bit bus is designated (notified by the SSIZ signal) or not (the 32-bit bus is designated).

FIG. 4 shows the values outputted onto the BE3(−) to BE0(−) terminals 123. These BE3(−) to BE0(−) terminals 123 includes latches so that the value of the BE3(−) to BE0(−) terminals 123 change in synchronism with the bus cycle, and CMD 133 has latches so that the CMD 133 change in synchronism with the rising of the BBGN signal.

In addition, when the 16-bit bus is designated (notified by the SSIZ signal), the BE3(−) and BE2(−) terminals are driven into a Hi-Z condition ("Z" is given in the table of FIG. 4) in order to reduce the number of the terminals to be driven, and in order to reduce the power consumption.

Furthermore, the CMD 133 generates various control signals for the data section of the BU 105 shown in FIG. 2. The OPWHHS, OPWHLS and OPWLLS signals are generated when the write bus cycle is requested by the LR/W(−) signal (which is detected by the active "0" of the LR/W(−) signal). The OPRHST, OPRLST and OPRHSL signals are generated when the read bus cycle is requested (which is detected by the inactive "1" of the LR/W(−) signal). Each signal is basically determined by the kind of bus cycle (notified by the LR/W(−) signal), the designated address (notified by the LIA1-LIA0 signal) and the bit length of data (notified by the LTYP1-LTYP0 signal). However, When the additional bus cycle is designated (notified by the APND signal, or when the 16-bit bus is designated (notified by the SSIZ signal), these designation is considered.

FIG. 5 shows a generation condition of various signals. In addition, for each signal, the timing signal is masked as follows:

OPWHHS, OPWHLS and OPWLLS:
   outputting timing to the data bus terminal 122 by the BCYC signal (only in the case of the write bus cycle)

OPRHST, OPRLST:
   inputting timing from the data bus terminal 122 by the DST signal (only in the case of the read bus cycle)

Now, operation will be described on the case of reading/writing a 32-bit data "$12345678_h$," to an address "$00000004_h$," where the subscript indicates a hexadecimal notation.

(1) When the 32-bit bus is designated:

At the time of resetting, since the SIZ16B(−) terminal 124 is inactive ("1"), the SZL 135 holds the SSIZ signal in the "0" condition. In addition, by ceaselessly maintaining the SZRQ(−) terminal 125 in an inactive condition ("1"), even if the SZRQST signal is generated, the SZL 135 holds the DSIZ signal in the "0" condition.

In the case of write transfer, prior to the start request of the write bus cycle, the internal data bus ID31 to ID0 is driven to "$12345678_h$", and the OPWST signal is generated. As a result, "$12345678_h$" is latched in the OPW 111.

Furthermore, the EU 104 generates the bus cycle start request BREQ signal, and at the same time, drives the IA1-IA0 signal, the TYP1-TYP0 signal, and the R/W(−) signal to "$00_b$", "$10_b$" and "$0_b$", respectively. These signals are latched in the CML 131. In response to the BREQ signal, the BCS 132 starts the bus cycle generation. Since the SSIZ signal and the DSIZ signal are maintained inactive ("0"), the BCD 134 does not generate the APND signal, so that the additional bus cycle is not generated. Accordingly, as seen from FIG. 4, the CMD 133 drives the BE3(−) to BE0(0) terminals 123 to "$0000_b$," in synchronism with the write bus cycle.

Furthermore, as seen from FIG. 5, the CMD 133 activates the OPWHHS signal and the OPWLLS signal in synchronism with the write bus cycle, so that the most significant 16 bits ("$1234_h$") of the OPW 111 is outputted to D31 to D16 of the data bus terminals 122 through the operand write buffer 114, and the least significant 16 bits ("$5678_h$") of the OPW 111 is outputted to D15 to D0 of the data bus terminals 122 through the operand write buffer 116.

In the case of read transfer, the EU 104 generates the bus cycle start request BREQ signal, and at the same time, drives the IA1-IA0 signal, the TYP1-TYP0 signal, and the R/W(−) signal to "$00_b$", "$10_b$" and "$1_b$", respectively. These signals are latched in the CML 131. In response to the BREQ signal, the BCS 132 starts the bus cycle generation. Since the SSIZ signal and the DSIZ signal are maintained inactive ("0"), the BCD 134 does not generate the APND signal, so that the additional bus cycle is not generated. Accordingly, as seen from FIG. 4, the CMD 133 drives the BE3(−) to BE0(0) terminals 123 to "0000$_b$," in synchronism with the read bus cycle.

Furthermore, as seen from FIG. 5, the CMD 133 activates the OPRHST signal and the OPRLST signal in synchronism with the read bus cycle, so that data on D31 to D16 of the data bus terminals 122 is latched through the MUX 117 in the OPRH 112 ("1234$_h$") and data on D15 to D0 of the data bus terminals 122 is latched in the OPRL 113 ("5678$_h$"). Although it is omitted in the drawing, when the completion of the read bus cycle is notified from the BU 105, the OPRLD signal is generated so that the content of the OPRH 1.12 and the OPRL 113 are driven to the internal data bus ID31 to 112)0 through the operand read buffers 118 and 119, respectively, so that the data is fetched into the EU 104.

(2) Where the dynamic sizing is designated:

At the time of resetting, since the SIZ16B(−) terminal 124 is inactive ("1"), the SZL 135 holds the SSIZ signal in the "0" condition. In addition, by activating the SZRQ(−) terminal 125 in response to the bus cycle or ceaselessly maintaining the SZRQ(−) terminal 125 in an active condition ("0"), when the SZRQST signal is generated, the SZL 135 holds the DSIZ signal in the "1" condition (which is held for a predetermined constant period of time when it is inputted in synchronism with the bus cycle).

In the case of write transfer, the SSIZ signal is maintained inactive ("0"). When the DSIZ signal is activated, the BCD 134 generates the APND signal after completion of the first bus cycle, so that the additional bus cycle is generated. As seen from FIG. 4, the CMD 133 drives the BE3(−) to BE0(0) terminals 123 to "0000$_b$," in synchronism with the first write bus cycle, and also drives the BE3(−) to BE0(0) terminals 123 to "0011$_b$," in synchronism with the additional write bus cycle.

Furthermore, as seen from FIG. 5, the CMD 133 activates the OPWHHS signal and the OPWLLS signal in synchronism with the first write bus cycle, so that most significant 16 bits ("1234$_h$") of the OPW 111 is outputted to D31 to D16 of the data bus terminals 122 through the operand write buffer 114, and the least significant 16 bits ("5678$_h$") of the OPW 111 is outputted to D15 to D0 of the data bus terminals 122 through the operand write buffer 116. In the additional write bus cycle, the CMD 133 activates the OPWHHS signal and the OPWHLS signal, so that the most significant 16 bits ("1234$_h$") of the OPW 111 is outputted to D31 to D16 of the data bus terminals 122 through the operand write buffer 114, and also, the most significant 16 bits ("1234$_h$") of the OPW 111 is outputted to D15 to D0 of the data bus terminals 122 through the operand write buffer 115. Here, the data ("1234$_h$") outputted to D31 to D16 of the data bus terminals 122 is redundant to the actual writing. Therefore, generation of the OPWHHS signal can be inhibited by the CMD 133 so that D31 to D16 of the data bus terminals 122 are brought into a Hi-Z condition.

In the case of read transfer, the BCD 134 generates the APND signal when the first bus cycle is completed, so that the additional bus cycle is generated. As seen from FIG. 4, the. CMD 133 drives the BE3(−) to BE0(0) terminals 123 to "0000$_b$," in synchronism with the first read bus cycle, and also drives the BE3(−) to BE0(0) terminals 123 to "0011$_b$," in synchronism with the additional read bus cycle.

Furthermore, as seen from FIG. 5, the CMD 133 activates the OPRHST signal and the OPRLST signal in synchronism with the first read bus cycle, so that data on D31 to D16 of the data bus terminals 122 is latched through the MUX 117 in the OPRH 112 ("indefinite value") and data on D15 to D0 of the data bus terminals 122 is latched in the OPRL 113 ("5678$_h$"). The data ("indefinite value") latched in the OPRH 112 at this time is an invalid data.

In the additional read cycle, the CMD 133 activates the OPRHST signal and the OPRHSL signal, so that data on D15 to D0 of the data bus terminals 122 is latched through the MUX 117 in the OPRH 112 ("1234$_h$").

The reading of the content of the OPRH 112 and the OPRL 113 to the EU 104 is the same as that of the read transfer operation when the 32-bit bus is designated, and therefore, explanation will be omitted.

(3) When the 16-bit bus is designated:

At the time of resetting, since the SIZ16B(−) terminal 124 is active ("0"), the SZL 135 holds the SSIZ signal in the "1" condition. In addition, regardless of the status of the SZRQ(−) terminal 125, the SZL 135 holds the DSIZ signal in the "0" condition.

In the case of write transfer, since the SSIZ signal is maintained inactive ("0"), in each of the bus cycle start requests the BCD 134 generates the APND Signal at completion of the first bus cycle, so that the additional bus cycle is generated. As seen from FIG. 4, the CMD 133 drives the BE3(−) to BE0(0) terminals 123 to "ZZ00$_b$," in synchronism with the first write bus cycle, and also drives the BE3(−) to BE0(0) terminals 123 to "ZZ00$_b$," in synchronism with the additional write bus cycle.

Furthermore, as seen from FIG. 5, the CMD 133 activates the OPWLLS signal in synchronism with the first write bus cycle, so that the least significant 16 bits ("5678$_h$") of the OPW 111 is outputted to D15 to D0 of the data bus terminals 122 through the operand write buffer 116. In the additional write bus cycle, the CMD 133 activates the OPWHLS signal, so that the most significant 16 bits ("1234$_h$") of the OPW 111 is outputted to D15 to D0 of the data bus terminals 122 through the operand write buffer 115.

In both of the first bus cycle and the additional bus cycle, D32 to D16 of the data bus terminals 1.22 are maintained in the Hi-Z condition.

In the case of read transfer, an operation is the same as that of the read transfer operation when the dynamic sizing is designated, and therefore, explanation will be omitted.

Figure 6:
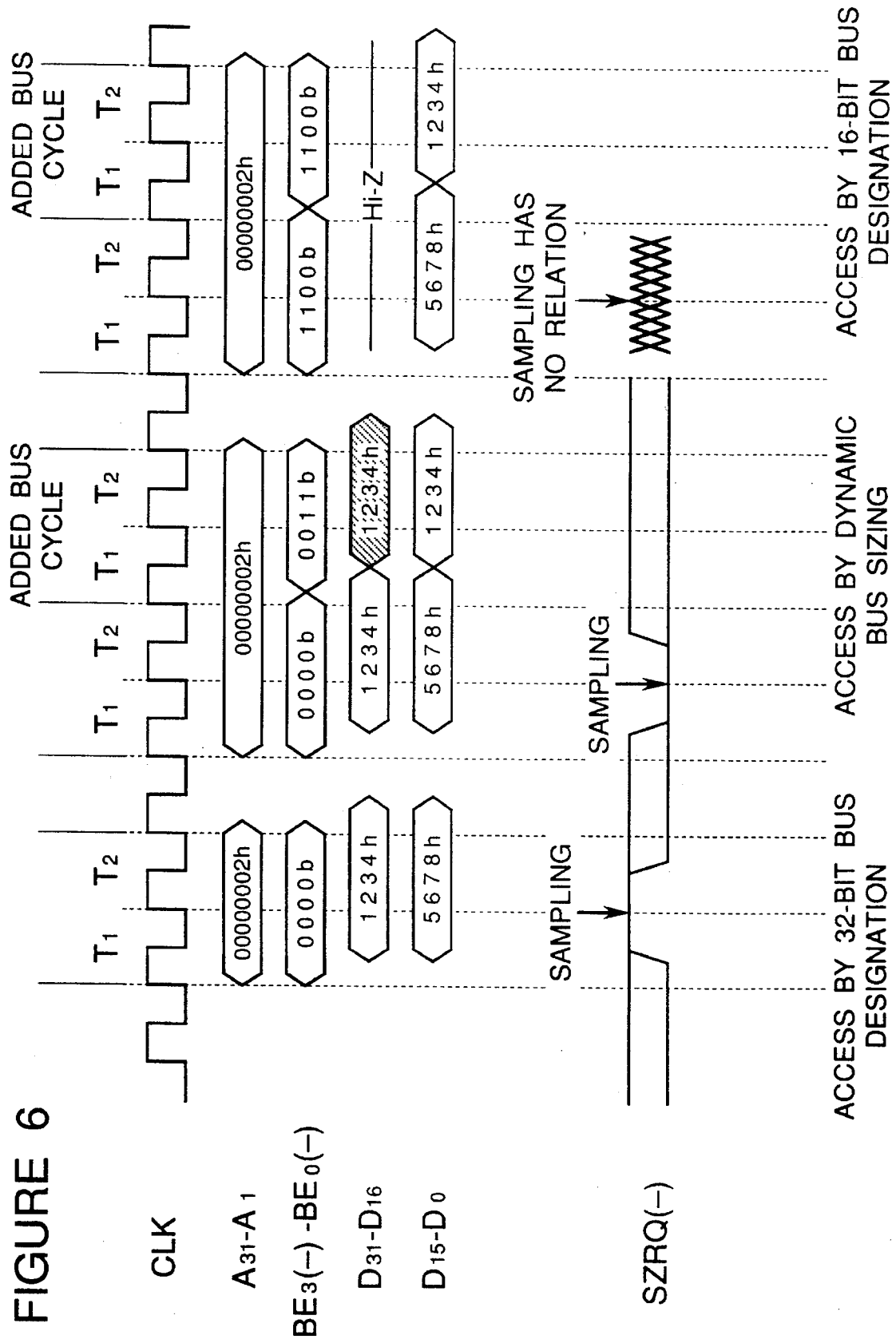
FIG. 6 shows a timing chart illustrating the above mentioned operation example in the write bus cycle of the first embodiment of the microprocessor.

FIG. 6 shows a timing chart illustrating the above mentioned operation example in the write bus cycle.

In the above mentioned example, in the cases other than the case (3) in which the 16-bit bus is designated, the using mode of the data bus terminal D31 to D0, 122 in the first bus cycle is changed as follows, dependently upon the bit length of the data, namely upon the least significant two bits (IA1 to IA0).

| (1) 8-bit data: | IA1 − IA0 = 00$_b$ | D7–D0 are used |
|---|---|---|
|  | IA1 − IA0 = 01$_b$ | D15–D8 are used |
|  | IA1 − IA0 = 10$_b$ | D23–D16 are used |
|  | IA1 − IA0 = 11$_b$ | D32–D24 are used |
| (2) 16-bit data: | IA1 − IA0 = 0X$_b$ | D15–D0 are used |
|  | IA1 − IA0 = 1X$_b$ | D32–D16 are used |

A data exchange function for aligning the position of the LSB (least significant bit) of the data as shown above in accordance with the address to be data-transferred, is called an alignment function. This alignment function should be performed in the course of the data transfer between the EU 104 and the BU 105, or before or after file data processing of the EU 104. Accordingly, the alignment function has no relation to the essence of the present invention and therefore, explanation will be omitted.

Figure 7:
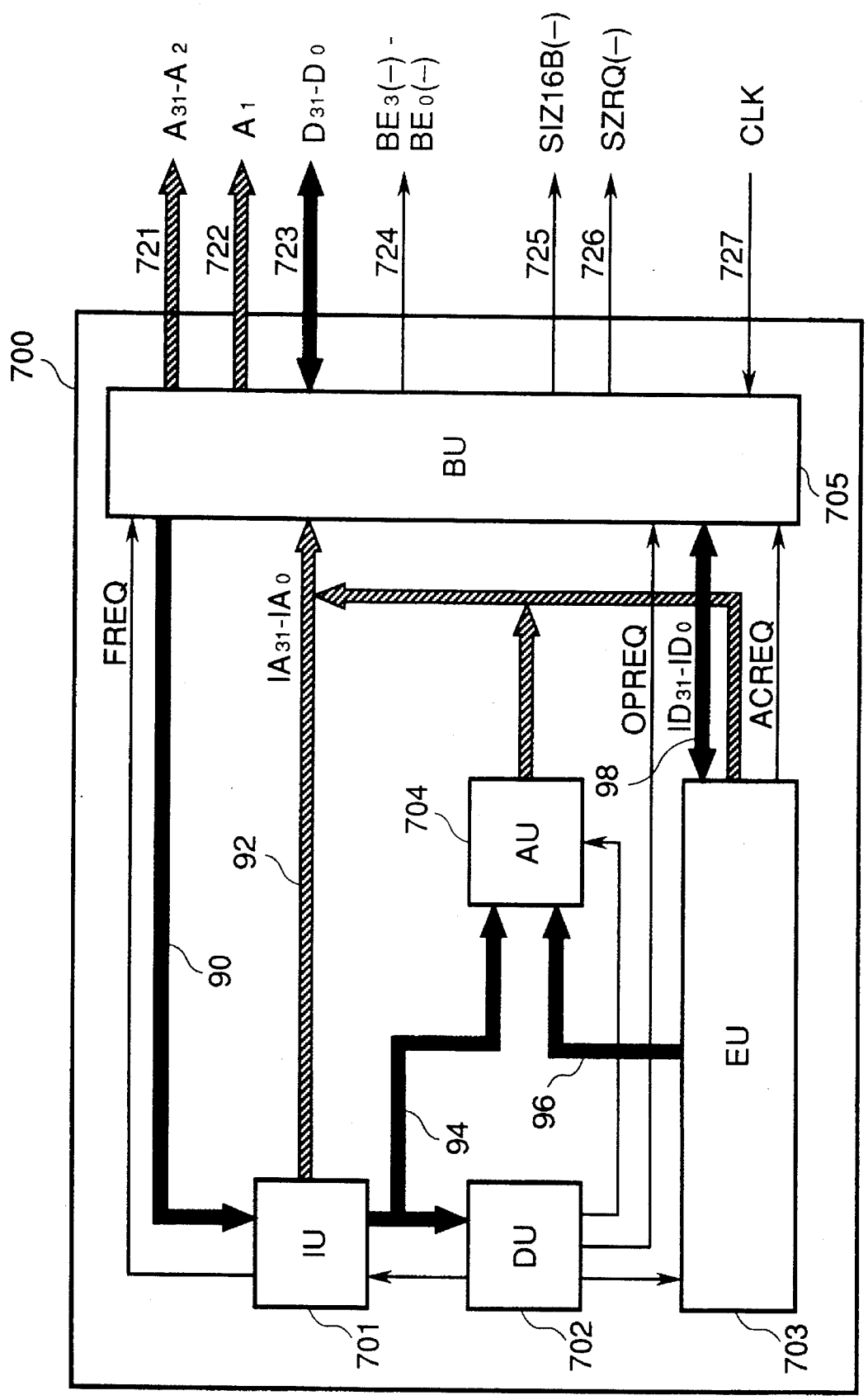
FIG. 7 is a block diagram of a second embodiment of the microprocessor in accordance with the present invention capable of connecting with a 16-bit data bus or a 32-bit data bus.

Referring to FIG. 7, there is shown a block diagram of another embodiment of the microprocessor in accordance with the present invention capable of connecting with a 16-bit data bus or a 32-bit data bus. The shown microprocessor, generally designated by Reference Numeral 700, and capable of carrying out a pipelined operation, comprises an instruction Fetch unit (abbreviated to "IU") 701, an instruction decoding Unit (abbreviated to "DU") 702, an instruction execution unit (abbreviated to "EU") 703, an effective address calculation unit (abbreviated to "AU") 704 and a bus cycle control unit (abbreviated to "BU") 705.

The IU 701, the DU 702, the EU 703, the AU 704 and the BU 705 of the second embodiment substantially correspond to the IU 101, the DU 102, the EU 103, the AU 104 and the BU 105 of the first embodiment, respectively, excepting the following points. In addition, buses 90, 92, 94, 96 and 98 corresponds to the buses 80, 82, 84, 86 and 88 of the first embodiment, respectively. Therefore, explanation will be limited to features of the second embodiment different from the first embodiment For the bus cycle, the BU 705 has address bus terminals A31 to A1 for outputting a 31-bit half word address (address of 16-bit unit) (A31 to A2: 721 and A1: 722), data bus terminals 723 of D31 to D1 for sending and receiving a 32-bit data, byte enable output terminals 724 of B3E(−) to B0E(−), where the sign "−" (minus) indicates a negative logic). B3E(−) corresponds to D31 to D24, and B2E(−), B1E(−) and B0E(−) correspond to D23 to D16, D15 to D8, and D7 to D0, respectively. The BU 705 also has an input terminal 725, SIZE16B(−) for designating that the data is transferred by using the least significant 16 bits of the data bus, at the time of resetting, and another input terminal 726, SZRQ(−) for requesting issue of an additional bus cycle and a dynamic bus sizing function for the 16-bit data bus.

Figure 8:
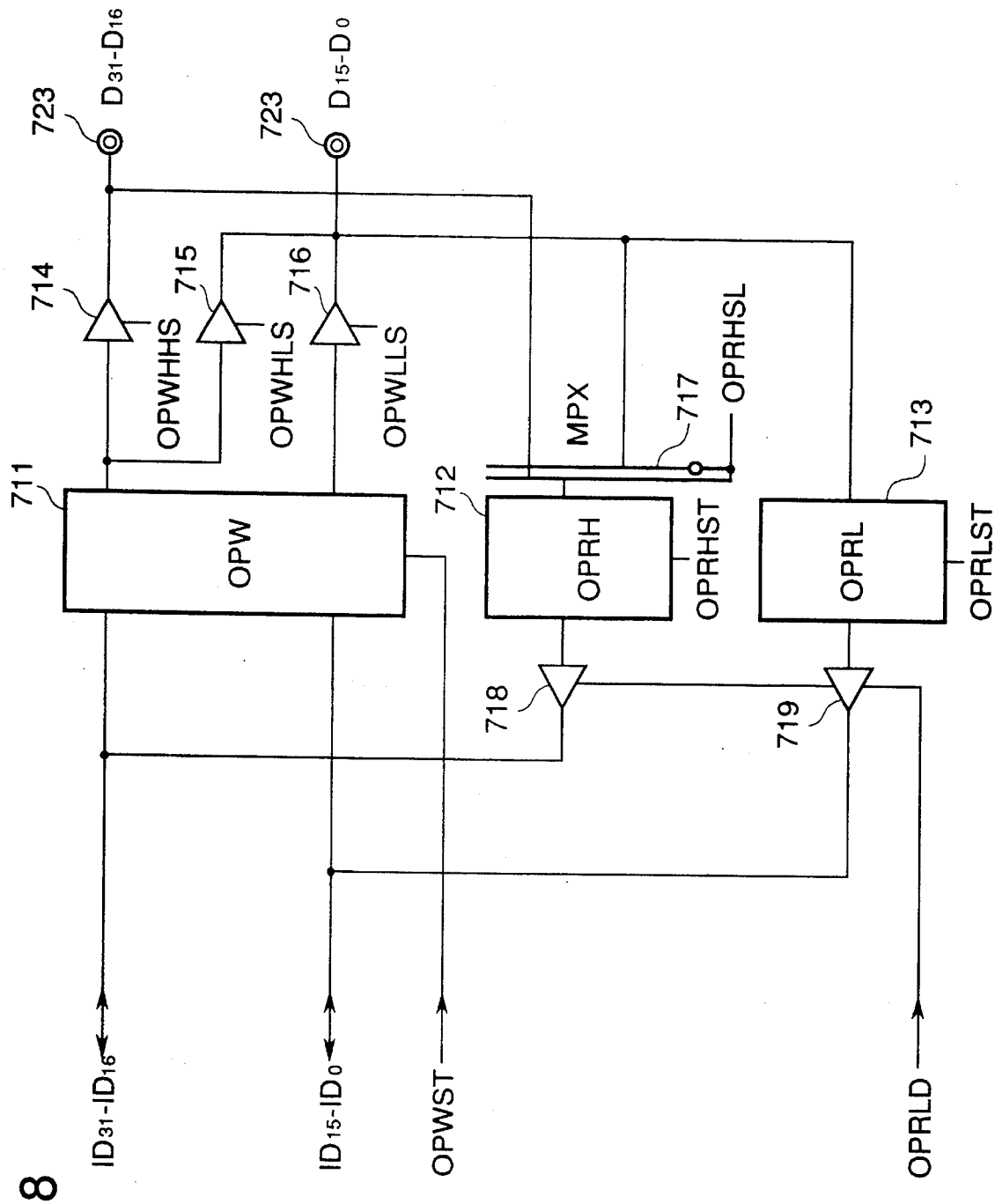
FIG. 8 is a block diagram of the data section of the bus cycle control unit shown in FIG. 7.
Figure 9:
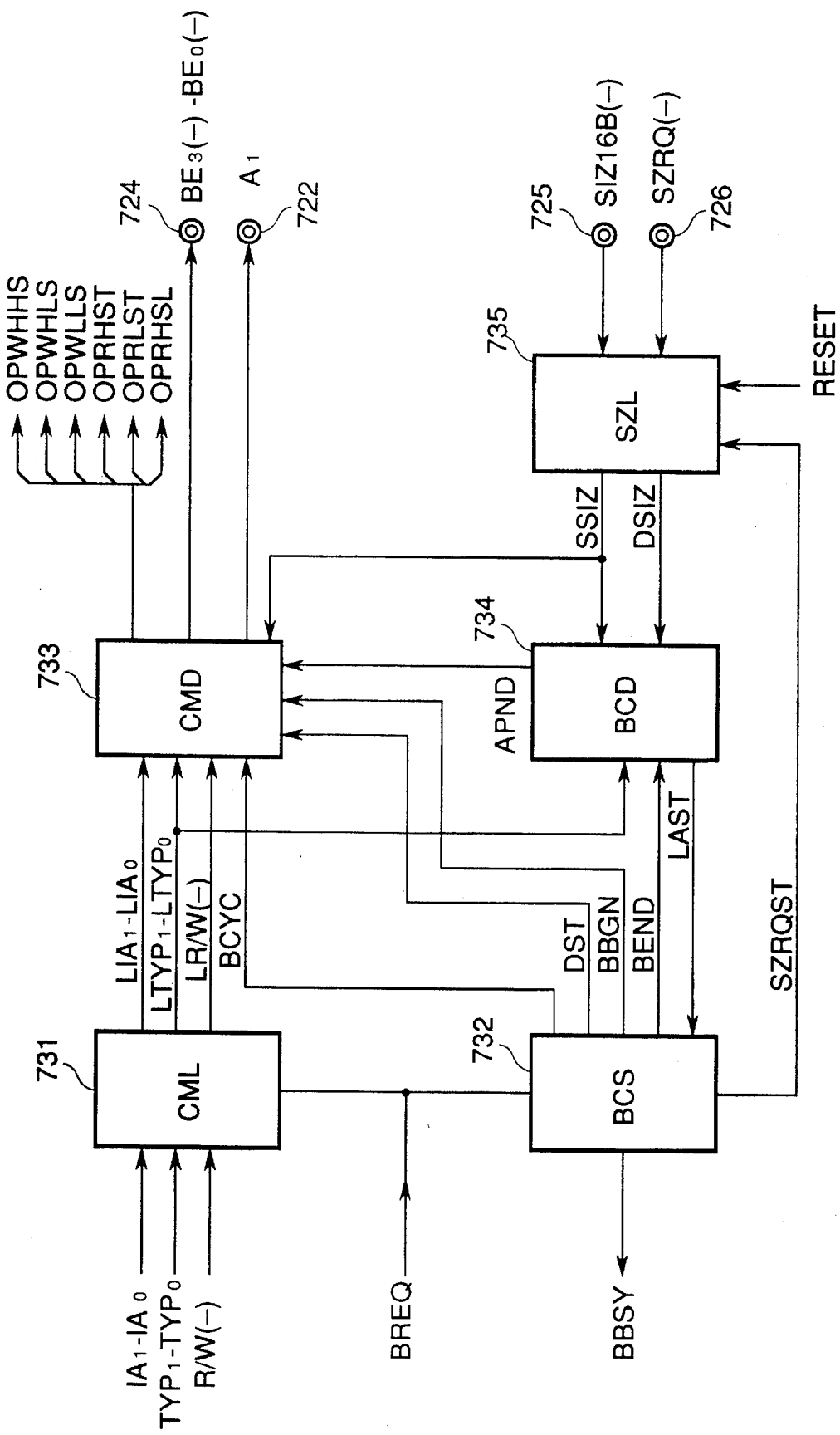
FIG. 9 is a block diagram, of the control section of the bus cycle control unit shown in FIG. 7.

Referring to FIGS. 8 and 9, there are respectively shown a data section and a control section of the BU 705 which are important in the present invention.

The data section shown in FIG. 8 includes an operand write register (abbreviated "OPW") 711, a most significant 16-bit register (abbreviated "OPRH") 712, a least significant 16-bit register (abbreviated "OPRL") 713, operand write buffers 714, 715 and 716, a multiplexor (abbreviated "MUX") 717, and operand read buffers 718 and 719, which correspond to the OPW 1 11, the OPRH 112, the OPRL 113, the operand write buffers 114, 115 and 116 the MUX 117, and the operand read buffers 118 and 119 of the tint embodiment, respectively. In FIG. 8, in addition, the same signals as those shown in FIG. 2 are given the same labels or legends. Therefore, explanation of construction and operation of the data section shown in FIG. 8 will be omitted.

The control section shown in FIG. 9 comprises a command register (abbreviated "CML") 731, a bus cycle sequencer (abbreviated "BCS") 732, a command decoder (abbreviated "CMD") 733, a bus cycle detector (abbreviated "BCD") 734, and a sizing register (abbreviated "SZL") 735, which substantially correspond to the CML 131, the BCS 132, the CMD 133, the BCD 134 and the SZL 135 of the first embodiment shown in FIG. 3, excepting the following points. In addition, in FIG. 9, the same signals as those shown in FIG. 3 are given the same labels or legends. Therefore, explanation will be limited to features of the second embodiment different from the first embodiment.

The SZL 735 responds to a reset signal RESET so as to latch the status of the 16-bit bus designation input terminal SIZ16B(−) 725. When the 16-bit bus is designated (namely, when 16-bit bus designation input terminal SIZ16B(−) 725 is active), the SZL 735 holds the SSIZ signal in an active condition ("1"). When the 16-bit bus is not designated (namely, when 16-bit bus designation input terminal SIZ16B(−) 725 is inactive), the SZL 735 holds the SSIZ signal in an inactive condition ("0"). In addition, the BVCD 735 latches the status of the dynamic sizing input terminal SZRQ(−) 726 in response to a SZRQST signal. If the dynamic sizing is designed (namely when the dynamic sizing input terminal SZRQ(−) 726 is active, the SZL 735 holds the DSIZ signal in an active condition ("1").

The CMD 733 drives the byte enable terminals BE3(−) to BE0(−) 724 and the address bus terminal A1 722 on the basis of various signals supplied from the CML 731, the BCS 732, the BCD 734 and the SZL 735. Basically, the driving of the byte enable terminals BE3(−) to BE0(−) 724 is determined by the designated address (notified by the LIA1-LIA0 signal) and the bit length of the data (notified by the LTYP1-LTYP0 signal) and on the basis of whether or not the additional bus cycle (notified by the APND signal) is designated. However, the output value is different, dependently upon whether the 16-bit bus is designated (notified by the SSIZ signal) or not (the 32-bit bus is designated).

Furthermore, the CMD 733 generates various control signal for the data section of the BU 705 shown in FIG. 8. The OPWHHS, OPWHLS and OPWLLS signals are generated when the write bus cycle is requested by the LR/W(−) signal (which is detected by the active "0" of the LR/W(−) signal). The OPRHST, OPRLST and OPRHSL signals are generated when the read bus cycle is requested (which is detected by the inactive "1" of the LR/W(−) signal). Each signal is basically determined by the kind of bus cycle (notified by the LR/W(−)signal), the designated address (notified by the LIA1-LIA0 signal) and the bit length of data (notified by the LTYP1-LTYP0 signal). However, when the additional bus cycle is designated (notified by the APND signal, or when the 16-bit bus is designated (notified by the SSIZ signal), these designation is considered.

FIG. 10 shows the output values of the A1 terminal 722, and the BE3(−) to BE0(−) terminals 724 and other signals. The A1 terminal 722, and the BE3(−) to BE0(−) terminals 724 includes latches so that the values of these terminals change in synchronism with the bus cycle, and the CMD 733 has latches so that the CMD 733 change in synchronism with the rising of the BBGN signal.

In addition, when the 16-bit bus is designated, the BE3(−) and BE2(−) terminals are driven into a Hi-Z condition ("Z" is given in the table of FIG. 4) in order to reduce the number of the terminals to be driven, and in order to reduce the power consumption.

For each signal, the timing signal is masked as follows:
  OPWHHS, OPWHLS and OPWLLS:
    outputting timing to the data bus terminal 723 by the BCYC signal (only in the case of the write bus cycle)
  OPRHST, OPRLST:
    inputting timing from the data bus terminal 723 by the DST signal (only in the case of the read bus cycle)

Now, operation will be described on the ease of reading/writing a 32-bit data "$12345678_h$" to an address "$00000004_h$", where the subscript indicates a hexadecimal notation.

(1) When the 32-bit bus is designated:

At the time of resetting, since the SIZ16B(−) terminal 725 is inactive, the SZL 735 holds the SSIZ signal in the "0" condition. In addition, by ceaselessly maintaining the SZRQ(−) terminal 726 in an inactive condition ("1"), even if the SZRQST signal is generated, the SZL 735 holds the D8IZ signal in the "0" condition.

In the case of write transfer, prior to the start request of the write bus cycle, the internal data bus ID31 to ID0 is driven to "$12345678_h$", and the OPWST signal is generated. As a result, "$12345678_h$" is latched in the OPW 711.

Furthermore, the EU 704 generates the bus cycle start request BREQ signal, and at the same time, drives the IA1-IA0 signal, the TYP1-TYP0 signal, and the R/W(−) signal to "$00_b$", "$1X_b$" and "$0_b$", respectively. These signals are latched in the CML 731. In response to the BREQ signal, the BCS 732 starts the bus cycle generation. Since the SSIZ signal and the D8IZ signal are maintained at "0", the BCD 734 does not generate the APND signal, so that the additional bus cycle is not generated. Accordingly, as seen from FIG. 10, the CMD 733 drives the BE3(−) to BE0(0) terminals 724 to "$0000_b$" in synchronism with the write bus cycle.

Furthermore, the CMD 733 activates the OPWHHS signal and the OPWLLS signal in synchronism with the write bus cycle, so that the most significant 16 bits ("$1234_h$") of the OPW 711 is outputted to D31 to D16 of the data bus terminals 723 through the operand write buffer 714, and the least significant 16 bits ("$5678_h$") of the OPW 711 is outputted to D15 to D0 of the data bus terminals 723 through the operand write buffer 716.

In the case of read transfer, the EU 704 generates the bus cycle start request BREQ signal, and at the same time, drives the IA1-IA0 signal the TYP1-TYP0 signal, and the R/W(−) signal to "$00_b$", "$10_b$" and "$1_b$", respectively. These signals are latched in the CML 731. In response to the BREQ signal, the BCS 732 starts the bus cycle generation. Since the SSIZ signal and the D8IZ signal are maintained at "0", the BCD 734 does not generate the APND signal, so that the additional bus cycle is not generated. Accordingly, as seen from FIG. 10, the CMD 733 drives the BE3(−) to BE0(0) terminals 724 to "$0000_b$" in synchronism with the read bus cycle.

Furthermore, the CMD 733 activates the OPRHST signal and the OPRLST signal in synchronism with the read bus cycle, so that data on D31 to D16 of the data bus terminals 723 is latched through the MUX 717 in the OPRH 712 ("$1234_h$") and data on D15 to D0 of the data bus terminals 723 is latched in the OPRL 713 ("$5678_h$"). When the completion of the read bus cycle is notified from the BU 705, the OPRLD signal is generated so that the content of the OPRH 712 and the OPRL 713 are driven to the internal data bus ID31 to ID0 through the operand read buffers 718 and 719, respectively, so that the data is fetched into the EU 704.

(2) When the dynamic sizing is designated:

At the time of resetting, since the SIZ16B(−) terminal 725 is inactive, the SZL 735 holds the SSIZ signal in the "0" condition. In addition, in response to the bus cycle or by ceaselessly maintaining the SZRQ(−) terminal 726 in an active condition ("0"), when the SZRQST signal is generated, the SZL 735 holds the D8IZ signal in the "1" condition (which is held for a predetermined constant period of time when it is inputted in synchronism with the bus cycle).

In the case of write transfer, the SSIZ signal is maintained at "0". When the DSIZ signal is activated, the BCD 734 generates the APND signal after completion of the first bus cycle, so that the additional bus cycle is generated. As seen from FIG. 10, the CMD 733 drives the A1 terminal to "0" and the BE3(−) to BE0(0) terminals 724 to "$0000_b$" in synchronism with the first write bus cycle, respectively. In the additional write bus cycle, the CMD 733 also drives the A1 terminal to "1" and the BE3(−) to BE0(0) terminals 724 to "$0011_b$" in synchronism with the additional write bus cycle, respectively.

Furthermore, the CMD 733 activates the OPWHHS signal and the OPWLLS signal in synchronism with the first write bus cycle, so that the most significant 16 bits ("$1234_h$") of the OPW 711 is outputted to D31 to D16 of the data bus terminals 723 through the operand write buffer 714, and the least significant 16 bits ("$5678_h$") of the OPW 711 is outputted to D15 to D0 of the data bus terminals 723 through the operand write buffer 716. In the additional write bus cycle, the CMD 733 activates the OPWHHS signal and the OPWHLS signal, so that the most significant 16 bits ("$1234_h$") of the OPW 711 is outputted to D31 to D16 of the data bus terminals 723 through the operand write buffer 714, and also, the most significant 16 bits ("$1234_h$") of the OPW 711 is outputted to D15 to D0 of the data bus terminals 723 through the operand write buffer 715. Here, the data ("$1234_h$") outputted to D31 to D16 of the data bus terminals 723 is redundant to the actual writing. Therefore, generation of the OPWHHS signal can be inhibited by the CMD 733 so that D31 to D16 of the data bus terminals 723 are brought into a Hi-Z condition.

In the case of read transfer, the BCD 734 generates the APND signal when the first bus cycle is completed, so that the additional bus cycle is generated. As seen from FIG. 10, the CMD 733 drives the A1 terminal to "0" and the BE3(−) to BE0(0) terminals 724 to "$0000_b$" in synchronism with the first read bus cycle, respectively, and also drives the A1 terminal to "1" and the BE3(−) to BE0(0) terminals 724 to "$0011_b$" in synchronism with the additional read bus cycle, respectively.

Furthermore the CMD 733 activates the OPRHST signal and the OPRLST signal in synchronism with the BEND signal of the first read bus cycle, so that data on D31 to D16 of the data bus terminals 723 is latched through the MUX 717 in the OPRH 712 ("indefinite value") and data on D15 to D0 of the data bus terminals 723 is latched in the OPRL 713 ("$5678_h$"). The data ("indefinite value") latched in the OPRH 712 at this time is an invalid data.

In the additional read cycle, the CMD 733 activates the OPRHST signal and the OPRHSL signal, so that data on D15 to D0 of the data bus terminals 723 is latched through the MUX 717 in the OPRH 712 ("$1234_h$").

The reading of the content of the OPRH 712 and the OPRL 713 to the EU 704 is the same as that of the read transfer operation in the above mentioned example, and therefore, explanation will be omitted.

(3) When the 16-bit bus is designated:

At the time of resetting, since the SIZ16B(−) terminal 725 is active, the SZL 735 holds file SSIZ signal in the "1" condition. In addition, regardless of the status of the SZRQ(−) terminal 726, the SZL 735 holds the DSIZ signal in the "0" condition.

In the case of write transfer, since the SSIZ signal is maintained at "0", in each of the bus cycle start requests the BCD 734 generates the APND signal at completion of the first bus cycle, so that the additional bus cycle is generated. As seen from FIG. 10, the CMD 733 drives the A1 terminal to "0" and the BE3(−) to BE0(0) terminals 724 to "$ZZ00_b$" in synchronism with the first write bus cycle, respectively, and also drives the A1 terminal to "1" and the BE3(−) to BE0(0) terminals 724 to "$ZZ00_b$" in synchronism with the additional write bus cycle.

Furthermore, the CMD 733 activates the OPWLLS signal in synchronism with the first write bus cycle, so that the least significant 16 bits ("$5678_h$") of the OPW 711 is outputted to D15 to D0 of the data bus terminals 723 through the operand write buffer 716. In the additional write bus cycle, the CMD 733 activates the OPWHLS signal, so that the most significant 16 bits ("$1234_h$") of the OPW 711 is outputted to D15 to D0 of the data bus terminals 723 through the operand write buffer 715.

In both of the first bus cycle and the additional bus cycle, D32 to D16 of the data bus terminals 723 are maintained in the Hi-Z condition.

In the case of read transfer, the BCD 734 generates the APND signal when the first bus cycle is completed, so that the additional bus cycle is generated. As seen from FIG. 10, the CMD 733 drives the A1 terminal to "0" and the BE3(−) to BE0(0) terminals 724 to "$0000_b$," in synchronism with the first read bus cycle, respectively, and also drives the A1 terminal to "1" and the BE3(−) to BE0(0) terminals 724 to "$0011_b$," in synchronism with the additional read bus cycle, respectively.

Furthermore, the CMD 733 activates the OPRHST signal and the OPRLST signal in synchronism with the BEND signal of the first read bus cycle, so that data on D31 to D16 of the data bus terminals 723 is latched through the MUX 717 in the OPRH 712 ("indefinite value") and data on D15 to D0 of the data bus terminals 723 is latched in the OPRL 713 ("$5678_h$"). The data ("indefinite value") latched in the OPRH 712 at this time is an invalid data.

In the additional read cycle, the CMD 733 activates the OPRHST signal and the OPRHSL signal, so that data on D15 to D0 of the data bus terminals 723 is latched through the MUX 717 in the OPRH 712 ("$1234_h$").

The reading of the content of the OPRH 712 and the OPRL 713 to the EU 704 is the same as that of the read transfer operation in the above mentioned example, and therefore, explanation will be omitted.

Figure 11:
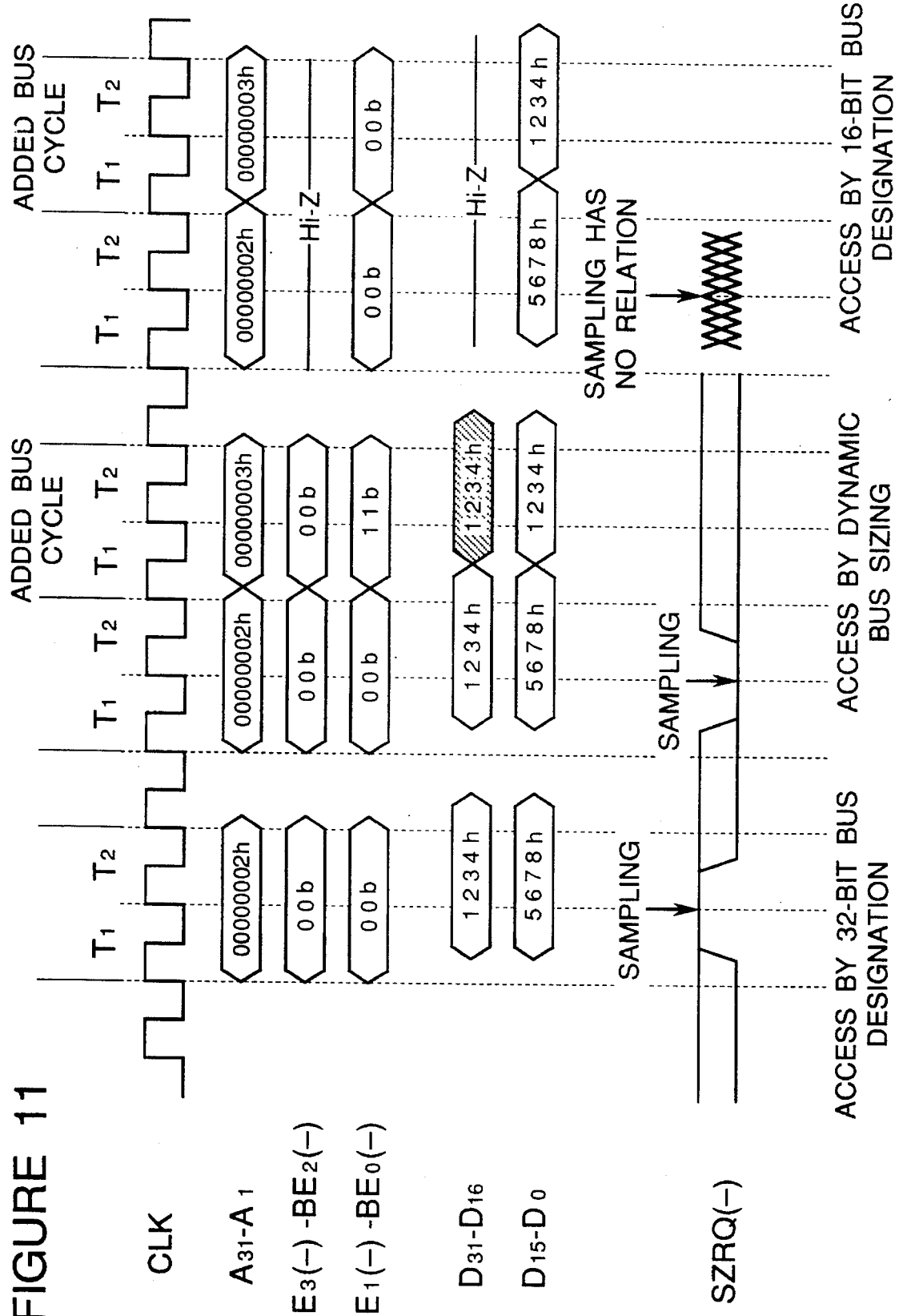
FIG. 11 shows a timing chart illustrating the above mentioned operation example in the write bus cycle of the first embodiment of the microprocessor.

FIG. 11 shows a timing chart illustrating the above mentioned operation example in the write bus cycle.

In the above mentioned example, in the cases other than the case (3) in which the 16-bit bus is designated, the using mode of the data bus terminal D31 to D0, 723 in the first bus cycle is changed as follows, dependently upon the bit length of the data, namely upon the least significant two bits (IA1 to IA0).

| | | |
|---|---|---|
| (1) 8-bit data: | IA1 − IA0 = $00_b$ | D7–D0 are used |
| | IA1 − IA0 = $01_b$ | D15–D8 are used |
| | IA1 − IA0 = $10_b$ | D23–D16 are used |
| | IA1 − IA0 = $11_b$ | D32–D24 are used |
| (2) 16-bit data: | IA1 − IA0 = $0X_b$ | D15–D0 are used |
| | IA1 − IA0 = $1X_b$ | D32–D16 are used |

As mentioned hereinbefore, the above data exchange function for aligning the position of the LSB of the data in accordance with the address to be data-transferred, should be performed in the course of the data transfer between the EU 704 and the BU 705, or before or after the data processing of the EU 704. However, the alignment function has no relation to the essence of the present invention and therefore, explanation will be omitted.

Figure 12:
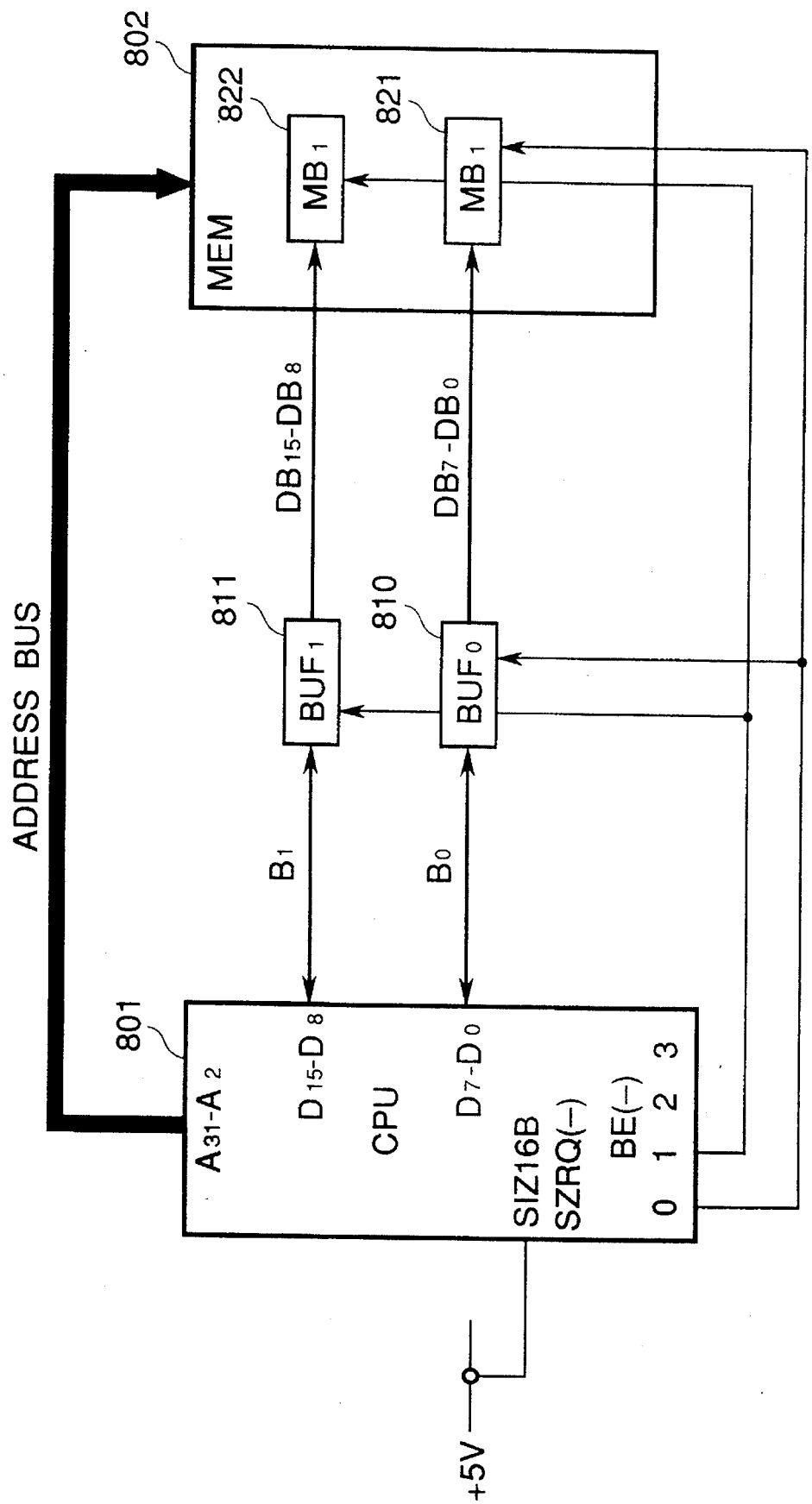
FIG. 12 is a block diagram of a data processing system which uses a microprocessor embodying the present invention and which is able to access an external memory through a data bus of 16-bit width.

Referring to FIG. 12, there is shown a block diagram of a data processing system which uses a microprocessor (CPU) 801 embodying the present invention and which is able to access an external memory (MEM) 802 through a data bus of 16-bit width. In order to ensure that the CPU 801 can ceaselessly access with the 16-width, the terminal SIZ16B is fixed to an active level ("1" level).

The CPU 801 has a 32-bit data bus terminal of D31 to D0. The least significant 16 bits of the 32 bit data terminal is divided into two of 8-bit unit (B1 and B0), which are respectively connected to DB15-DB8 and DB7-DB0 of an external data bus DB15 to DB0 through two 8-bit bidirectional buffers (BUF1) 811 and (BUF0) 810. On the other hand, the external memory 802 includes a least significant memory bank (MB0) 821 of 8-bit unit and a most significant memory bank (MB1) 822 of also 8-bit unit, which are coupled to the least significant 8 bits DB7-DB0 and the most significant 8 bits DB15-DB8 of the external data bus, respectively.

The CPU 801 has a 32-bit address terminal of A31 to A0, which are connected to an address input of the memory 802 through an address bus. In addition, in order to select either the memory bank 821 or the memory bank 822 for the same address, the BE0(−) terminal and the BE1(−) terminal of the CPU 801 are connected to the memory bank 821 and the memory bank 822, respectively.

As will be apparent from the above, the microprocessor accordance with the present invention can be freely coupled to (1) a data bus having a fixed 32-bit width, (2) a data bus having a data width which can be switched between 32 bits and 16 bits, and (3) a data bus having a fixed 16-bit width.

When the microprocessor in accordance with the present invention is coupled to the data bus having the fixed 16-bit width, the following advantages can be obtained:

(1) Since the conventional circuit required for the dynamic sizing can be used in common, the scale of the circuit is not increased.

(2) A data buffer for coupling the most significant 16 bits of the data bus terminal of the microprocessor with the least significant 16 bits of a system bus, which had been required in the dynamic sizing, becomes unnecessary, and therefore, a simple external circuit can be realized.

(3) Since the most significant 16 bits of the data bus terminal of the microprocessor can be ceaselessly put in the Hi-Z condition. Therefore, since an extra or wasteful driving of the data bus terminals can be prevented, a consumption of electric power can be reduced.

In the above mentioned embodiments, the data terminal of the microprocessor is of 32 bits, and the corresponding system bus has the data width of 32 bits or 16 bits. However, it would be apparent to persons skilled in the art that the data terminal of the microprocessor is not limited to 32 bits, and if the width of the corresponding system bus is any power of 2 (for example, addition of 8 bits), it can be coupled with a slight modification.

In addition the above mentioned embodiments have been described under the precondition that the 16-bit data are located with a half word boundary and the 32-bit data are located with a word boundary. It will be also apparent that the scope of the spirit of the present invention is not limited by this precondition.

Thus, according to the present invention, it is possible to obtain a microprocessor having a high wide-use property, which can be coupled to various memory systems in accordance with a required performance and cost.

The invention has thus been shown and described with reference to the specific embodiments. However, it should be noted that the present invention is in no way limited to the details of the illustrated structures but changes and modifications may be made within the scope of the appended claims.

We claim:

1. A microprocessor having a function of dynamically selecting, for each bus cycle, either a first data transfer mode in which data is transferred through the whole of a data bus terminal or a second data transfer mode in which data is transferred through only a portion of the data bus terminal, the microprocessor comprising:

a data bus terminal having a width of a plurality of bits, a command register for receiving a first external signal indicating a change of data transfer mode between said first data transfer mode and said second data transfer mode, a sizing register for receiving a second external signal indicating that only one portion of said data bus terminal is fixedly used for data transfer, a command decoder connected to said command register and to said sizing register for generating control signals, an operand write register and an operand read register connected to said data bus terminal for exchanging data that should be transferred through said one portion of said data bus terminal with data that should be transferred through the other portion of said data bus terminal, and buffer means, connected to said operand write register and to said operand read register and responsive to said control signals, for bringing the other portion of said data bus terminal into a high impedance condition when data is transferred through said one portion of said data bus terminal, so that when said sizing register receives said second external signal indicating that said one portion of said data bus terminal is fixedly used for data transfer and said one portion of said data bus terminal is signaled and an address to which data are to be transferred is signaled, data is transferred through said one portion of said data bus terminal under control of said command decoder regardless of receipt of said first external signal by said command register, and the other portion of said data bus terminal is maintained in a high impedance condition by said buffer means.

2. A microprocessor having a function of dynamically selecting, for each bus cycle, either a first data transfer mode in which data is transferred to a memory or an input/output device through the whole of a data bus terminal or a second data transfer mode in which data is transferred through only a portion of the data bus terminal, the microprocessor comprising:

a data bus terminal having a width of a plurality of bits, a command register for receiving a first external signal indicating a change of data transfer mode between said first data transfer mode and said second data transfer mode, a sizing register for receiving a second external signal indicating that only one portion of said data bus terminal is fixedly used for data transfer, a command decoder connected to said command register and to said sizing register for generating control signals, an operand write register, r and an operand read register connected to said data bus terminal for exchanging data that should be transferred through said one portion of said data bus terminal, with data that should be transferred through the whole of said data bus terminal, buffer means, connected to said operand write register and to said operand read register and responsive to said control signals, for bringing the other portion of said bus terminal into a high impedance condition when data is transferred through said one portion of said data bus terminal, said command decoder externally signaling an effective portion of said data bus terminal, said command decoder further externally signaling an address to which data is to be transferred through said data bus terminal, so that when said sizing register receives said second external signal indicating that said one portion of said data bus terminal is fixedly used for data transfer, data is transferred through said one portion of said data bus terminal under control of said command decoder regardless of receipt of said first external signal by said command register, and at the same time, an address is externally signaled by said command decoder and an effective portion of said data bus terminal is externally signaled by said command decoder, the other portion of said data bus terminal is maintained in a high impedance condition by said buffer means.

\* \* \* \* \*